United States Patent
Almojarkesh et al.

(10) Patent No.: US 12,106,766 B2
(45) Date of Patent: *Oct. 1, 2024

(54) SYSTEMS AND METHODS FOR PRE-FILTERING AUDIO CONTENT BASED ON PROMINENCE OF FREQUENCY CONTENT

(71) Applicant: SOUND GENETICS, INC., Camden, DE (US)

(72) Inventors: Anwar Almojarkesh, Birmingham (GB); Rick Kennedy, Scottsdale, AZ (US); Doyle Gerard, Overbrook, KS (US)

(73) Assignee: Sound Genetics, Inc., Camden, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/329,759

(22) Filed: Jun. 6, 2023

(65) Prior Publication Data

US 2023/0317095 A1 Oct. 5, 2023

Related U.S. Application Data

(63) Continuation of application No. 16/749,312, filed on Jan. 22, 2020, now Pat. No. 11,735,202.

(Continued)

(51) Int. Cl.
*G10L 21/0324* (2013.01)
*G06F 3/0482* (2013.01)
(Continued)

(52) U.S. Cl.
CPC ........ *G10L 21/0324* (2013.01); *G06F 3/0482* (2013.01); *G10L 21/0224* (2013.01);
(Continued)

(58) Field of Classification Search
CPC . G10L 21/0324; G10L 21/0224; G10L 21/10; G10L 25/51; G10L 15/02;
(Continued)

(56) References Cited

U.S. PATENT DOCUMENTS

| 6,567,416 B1 | 5/2003 | Chuah |
| 7,027,515 B2 | 4/2006 | Lin |

(Continued)

FOREIGN PATENT DOCUMENTS

| CN | 102246228 | 6/2014 |
| GB | 2466242 | 6/2010 |
| GB | 2492162 | 12/2012 |
| GB | 2494511 | 3/2013 |
| GB | 2534027 | 7/2016 |

OTHER PUBLICATIONS

International Search Report and Written Opinion issued in corresponding application No. PCT/US/2020/014559, dated May 21, 2020, 14 pages.

*Primary Examiner* — Linda Wong
(74) *Attorney, Agent, or Firm* — Meunier Carlin & Curfman LLC

(57) ABSTRACT

A system is disclosed for generating a sound detection score based on comparing a sound-generating apparatus producing incoming spoken audio content to a sound-generating apparatus that produced reference spoken audio content. Related systems, methods and computer-readable media are also disclosed.

21 Claims, 16 Drawing Sheets

Related U.S. Application Data

(60) Provisional application No. 62/795,675, filed on Jan. 23, 2019.

(51) Int. Cl.
  *G10L 21/0224* (2013.01)
  *G10L 21/10* (2013.01)
  *G10L 25/51* (2013.01)

(52) U.S. Cl.
  CPC .............. *G10L 21/10* (2013.01); *G10L 25/51* (2013.01); *G06F 2203/04806* (2013.01)

(58) Field of Classification Search
  CPC ..... G10L 21/02; G10L 21/0364; G10L 25/18; G06F 3/0482; G06F 2203/04806; G06F 3/04847
  See application file for complete search history.

(56) References Cited

U.S. PATENT DOCUMENTS

| | | |
|---|---|---|
| 8,320,743 B2 | 11/2012 | Neuman |
| 8,532,800 B2 | 9/2013 | Wang et al. |
| 9,018,547 B2 | 4/2015 | Rimon et al. |
| 9,286,909 B2 | 3/2016 | Gonzalez et al. |
| 10,332,520 B2 * | 6/2019 | Visser .................. G10L 13/047 |
| 2015/0063575 A1 | 3/2015 | Tan |
| 2015/0112678 A1 | 4/2015 | Binks et al. |
| 2016/0196343 A1 | 7/2016 | Rafii |
| 2016/0283967 A1 | 9/2016 | Mitchell |
| 2018/0182401 A1 | 6/2018 | Bruhn |
| 2018/0301140 A1 | 10/2018 | Turcott et al. |
| 2020/0160839 A1 * | 5/2020 | Short ..................... G10L 25/18 |

* cited by examiner

| SoundID | [x] | T1 | Param1 | Param2 | ... |
|---------|-----|----|--------|--------|-----|
| SoundID | [ ] | T2 | Param1 | Param2 | ... |
| SoundID | [x] | T3 | Param1 | Param2 | ... |
| SoundID | [x] | T4 | Param1 | Param2 | ... |
| ⋮ | | | | | |

| SoundID | T1 | 0.5 |
|---------|----|----|
| SoundID | T2 | 0.2 |
| SoundID | T3 | 0.2 |
| SoundID | T4 | 0.1 |
| ⋮ | | |

Fig. 4

SYSTEMS AND METHODS FOR PRE-FILTERING AUDIO CONTENT BASED ON PROMINENCE OF FREQUENCY CONTENT

CROSS-REFERENCE TO RELATED APPLICATION

This application is a continuation of U.S. patent application Ser. No. 16/749,312, filed Jan. 22, 2020, and claims priority to U.S. Provisional Patent Application Ser. No. 62/795,675 filed on Jan. 23, 2019, the contents of each application are expressly incorporated herein by reference.

FIELD OF THE INVENTION

The following relates generally to systems for digital audio processing, and more particularly to systems and processes for pre-filtering audio content based on prominence of frequency content.

BACKGROUND OF THE INVENTION

Sound identification is a process by which particular content of an audio signal is identified by a system. A computing system when presented with an electronic audio sample, such as one captured using a microphone, can electronically pre-process the audio sample and discern its various features and patterns using various processing techniques. The features and patterns may then be presented to a sound classification system that is accessible to the computing system, thereby to identify the contents of the audio sample in terms of similarities between its features and patterns and classes of sound derived from features and patterns of known sounds.

When a system is oriented to process a sound sample for identifying entire words and sentences, the system is adapted to be presented with a sound sample having a large number of easily-discernable features and patterns. These numerous distinctions enable the system to readily classify an incoming sound sample with reasonably little ambiguity. Various classification systems suited for entire words and sentences are known, and are typically built using machine learning techniques. With machine learning, an adaptable training model is trained typically using a large number of known sound samples so that it may predict, when presented with a sound sample it has not yet been exposed to, the correct classification of its contents. In order to be capable of reasonably accurate predictions, a machine learning system requires training on very large sets of sound samples so that it can develop the internal statistical models for handling robust classification.

Presenting a machine learning system with very large sample sets for a particular purpose can be time consuming. It can be challenging to find or produce very large sample sets and to clean the large sample sets to remove noise or outliers that would reduce the system's ability to discern between different sounds. Furthermore, the statistical models resulting from machine learning techniques are typically stored in very large databases. As such, classification systems built using machine learning are typically deployed using a client-server topology, where the classification system is maintained centrally and is accessed by various users remotely over a network connection, such as through the Internet. Individual devices not typically having the memory capacity for such large databases nor the onboard processing capacity to adapt an incoming sound sample for presentation to, and processing by, such classification systems, transfer received sound samples across the network to a server-based classification system. However, network communications introduces a noticeable delay between the receipt of the sound sample by the client device and the receipt by the client device of an indication as to how the sound sample has been classified, such as a response to the contents of the sound sample based on a server-based classification. Additionally, network bandwidth becomes occupied by server queries that are accompanied by what may be large audio files. Furthermore, with such an architecture, in the event that the client device is not connected to a network, the sound sample classification cannot be done at all.

Very short sounds, such as sounds with a duration of less than 1 second, are particularly challenging to discern and to classify using machine learning systems. This is because known techniques for extraction of features and patterns do not tend to be capable of producing the volume of discernable information about the sound within a reasonable time frame that, for example, an entire word or sentence might be able to more readily provide. Systems for handling shorter sounds, such as those for detecting gunshots or the sound of glass breaking, tend nevertheless to be implemented using a central machine-learning classification system.

While short sounds can generally be more difficult to discern using traditional feature and pattern extraction techniques, particular very short vocal sounds—those that are at the "sub-word" level such as phonemes uttered by a speaker, present particular challenges due to the fact that they are all produced by a human vocal structure rather than by different types of sources, and the distinctions between phonemes can be subtle. In general, phonemes are considered the perceptually distinct units of sound in a particular language that distinguish one word from another word.

Machine identification of phonemes in particular holds interest for speech and language professionals, particularly for use in training and testing a person in an unfamiliar language. It has been proposed by professionals involved with such training and testing that mastery of speaking the phonemes of a language in isolation is a precursor to mastery of both speaking and reading the words and sentences of the language. While in a classroom environment students benefit from the instant feedback provided during one-on-one training by a human language instructor who physically hears the sound, this form of training is not scalable; a single instructor can only provide feedback to so many students at a time. While there are sound identification software packages available for addressing teaching and training in languages, these tend to focus at the word-level because they have employed machine learning classification that is trained based on a conflation of individual short sounds—blended sounds. As such, they are not suitable for individual phonemes.

It would be useful, therefore, if there were a computer-based system that could provide low-delay feedback about the correctness of very short spoken sounds such as phonemes that could be deployed to, and be operable on, a personal computing device such as a smartphone, laptop or other device without overwhelming the resources of the device and without necessarily requiring the device to transfer information to and from a central server for sound identification and verification.

Furthermore, it would be useful if such a system once deployed was configurable to enable the system to be easily updated so as to be capable of discerning additional sounds using the same base of identification tests.

Furthermore, it would be useful if there were a computer-based system for pre-processing audio signals to put them in a condition in which information in the audio signals that is about content or meaning can be reasonably easily separated from information in the audio signals that is about the sound generating apparatus and/or due to noise. While using low-pass, band-pass, high-pass and other frequency-based filters is known for dealing with noise and for modifying an audio signal by filtering-out particular frequencies so that the filtered audio signal does not contain data at the filtered-out frequencies, it is possible that filtering-out data on the basis of frequency alone in such ways risks inadvertently removing important information about content/meaning and/or information about the sound generating apparatus that may be present and useful in a raw audio signal.

SUMMARY OF THE INVENTION

In accordance with an aspect, there is provided a system for processing electronic audio signals, the system comprising an audio transducer; an audio interface for generating digital samples of electronic audio signals captured using the audio transducer; a frame division process allocating sequences of the digital samples of the input electronic audio signal to respective frames; a frequency transform process for processing the digital samples by frame thereby to register, for each of the frames, a respective frequency set; a filtering process for filtering frequencies of each frequency set into a respective one of a plurality of orders based on relative prominence; an amplitude sequence process for generating multiple amplitude sequences based on the orders, each amplitude sequence n respectively comprising a sequence of amplitudes of the nth-order frequency content in the frames; and an output process for generating user-apprehendable content for a user interface of the system based on the multiple amplitude sequences.

The system and related methods disclosed herein transform audio signals into one or more amplitude sequences filtered into separate orders corresponding to frequency prominence. This pre-filtering of the audio signal according to frequency prominence enables subsequent analysis or other processing to be conducted differentially on (or without regard to one or the other of): audio information relating to meaning sought to be conveyed (such as words or phonemes independent of sound generating apparatus used to form them), information related to the sound generating apparatus (such as lips, cheeks, throat, sex, age, and potentially unique combinations of same etc. independent of the meaning of words or phonemes produced by same), as well as any background noise. By so separating information to be conveyed from information about the sound generating apparatus as well as information about background noise, downstream processes can be configured to specialize in specifically processing only one or the other of these for various specific applications, reducing processing and potentially eliminating the requirement for further filtering. Furthermore, depending on the specific application, information relating to meaning or information relating to the sound generating apparatus can be discarded in favour of the other, thereby to reduce the amount of memory required for any downstream storage of salient information and the amount of bandwidth required for any transmission and the amount of processor resources for further processing.

Processes and systems disclosed herein produce a number of processor-discernable features and patterns from sounds such as phonemes in audio signals that can be employed to conduct classification of content within the audio signals more readily than, and potentially using far less physical data content for classification than, prior art systems that require the raw audio signal itself to be presented to their classification systems. As such, the processes and systems disclosed herein may be used as substitutes for the raw audio signals during classification, further processing, transmission, storage for various uses, or may be used alongside such raw audio signals for increasing confidence in classifications being done by other classification systems using the raw audio signals.

The processes and systems disclosed herein may be used for producing, storing and/or transmitting features and patterns produced using a raw audio signal in order to replace the raw audio signal while retaining salient information carried in the features and patterns, for particular purposes such as for reducing the volume of storage or bandwidth required in order to store or transmit the salient information carried within the raw audio signals. Such salient information may be information about the meaning/content sought to be conveyed by the original source of the raw audio signal (sought to be conveyed by the person speaking, for example), information relating to the sound generating apparatus (about the person speaking, for example), and other information in the raw audio signal. In this disclosure, salient information refers to information carried in an audio signal presented to the systems or processes disclosed herein, whether or not such information was intended to be carried in the audio signal by its original creator, that is being sought after for a particular goal or purpose. It will be understood that such salient information, depending on the application may, in the physical form of the features and patterns represented in a computing system, occupy a smaller data footprint than the raw audio signal and, as such, the salient information produced by the systems and processes disclosed herein may be regarded as a particular form of compression of the raw audio signal, or a particular form of redundancy-reduction, or a particular form of data reduction, or a particular form of data division. Furthermore, in embodiments, such salient information may be used by a downstream process to seed production of a new, derivative audio signal and that, in respect only of the salient information represented by the features and patterns, is a reproduction of the raw audio signal from which the salient information was produced. That is, the derivative audio signal might be produced solely from the produced features and patterns and it would itself also contain the information about meaning/content and/or information about the sound generating apparatus that the raw audio signal had contained. Such a reproduction audio signal could be produced with a smaller data footprint than had the raw audio signal as certain information in the raw audio signal that was not deemed salient information would not be required to be present in the reproduction audio signal for the relied-upon purpose.

In an embodiment, the frame division process allocates a number of digital samples to respective frames based on a configurable sampling rate and a configurable frequency transform buffer size.

In an embodiment, the frequency transform process allocates a number of frequencies to each frequency set based at least on a configurable number of frequencies per frame.

In an embodiment, the frequency transform process allocates a number of frequencies to each frequency set based at least on a configurable frequency bandwidth.

In an embodiment, the frequency transform process allocates a number of frequencies to each frequency set based at least on a configurable amplitude threshold, wherein digital samples of the electronic sound signal having an amplitude below the configurable amplitude threshold are excluded.

In an embodiment, the output process comprises a display process configured to generate for display on a display device a visual representation of one or more of the multiple amplitude sequences.

In an embodiment, the display process further displays measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, the display process is further configured to display a user control for selecting, individually or collectively, one or more of the multiple amplitude sequences for display on the display device.

In an embodiment, the display process is further configured to provide a user control for zooming in on a portion of a displayed one or more amplitude sequences.

In an embodiment, the output process comprises a test process for testing the at least one amplitude sequence to generate measurements, the test process comparing the measurements to one or more respective threshold parameters to generate a sound detection score; and a user interface process for generating for a user a representation of the sound detection score.

According to another aspect, there is provided a method for processing electronic audio signals, the method comprising causing an audio transducer to capture electronic audio signals; causing an audio interface to generate digital samples of the electronic audio signals; allocating sequences of the digital samples of an input electronic audio signal to respective frames; processing the digital samples by frame thereby to register, for each of the frames, a respective frequency set; filtering frequencies of each frequency set into a respective one of a plurality of orders based on relative prominence; generating multiple amplitude sequences based on the orders, each amplitude sequence n respectively comprising a sequence of amplitudes of the nth-order frequency content in the frames; and generating user-apprehendable content for a user interface based on the multiple amplitude sequences.

In an embodiment, the allocating comprises allocating a number of digital samples to respective frames based on a configurable sampling rate and a configurable frequency transform buffer size.

In an embodiment, the allocating comprises allocating a number of frequencies to each frequency set based at least on a configurable number of frequencies per frame.

In an embodiment, the allocating comprises allocating a number of frequencies to each frequency set based at least on a configurable frequency bandwidth.

In an embodiment, the allocating comprises allocating a number of frequencies to each frequency set based at least on a configurable amplitude threshold, wherein digital samples of the electronic sound signal having an amplitude below the configurable amplitude threshold are excluded.

In an embodiment, the generating user-apprehendable content comprises generating for display on a display device a visual representation of one or more of the multiple amplitude sequences.

In an embodiment, the generating for display further comprises generating for display measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, generating user-apprehendable content comprises displaying a user control for selecting, individually or collectively, one or more of the multiple amplitude sequences for display on the display device.

In an embodiment, the generating for display on a display device comprises providing a user control for zooming in on a portion of a displayed one or more amplitude sequences.

In an embodiment, the generating user-apprehendable content based on the multiple amplitude sequences comprises testing the at least one amplitude sequence to generate measurements and comparing the measurements to one or more respective threshold parameters to generate a sound detection score; and generating for a user a representation of the sound detection score.

In accordance with another aspect, there is provided a non-transitory processor-readable medium embodying a computer program for processing electronic audio signals, the computer program comprising program code for causing an audio transducer to capture electronic audio signals; program code for causing an audio interface to generate digital samples of the electronic audio signals; program code for allocating sequences of the digital samples of an input electronic audio signal to respective frames; program code for processing the digital samples by frame thereby to register, for each of the frames, a respective frequency set; program code for filtering frequencies of each frequency set into a respective one of a plurality of orders based on relative prominence; program code for generating multiple amplitude sequences based on the orders, each amplitude sequence n respectively comprising a sequence of amplitudes of the nth-order frequency content in the frames; and program code for generating user-apprehendable content for a user interface based on the multiple amplitude sequences.

In an embodiment, the program code for allocating comprises program code for allocating a number of digital samples to respective frames based on a configurable sampling rate and a configurable frequency transform buffer size.

In an embodiment, the program code for allocating comprises program code for allocating a number of frequencies to each frequency set based at least on a configurable number of frequencies per frame.

In an embodiment, the program code for allocating comprises program code for allocating a number of frequencies to each frequency set based at least on a configurable frequency bandwidth.

In an embodiment, the program code for allocating comprises program code for allocating a number of frequencies to each frequency set based at least on a configurable amplitude threshold, wherein digital samples of the electronic sound signal having an amplitude below the configurable amplitude threshold are excluded.

In an embodiment, the program code for generating user-apprehendable content comprises program code for generating for display on a display device a visual representation of one or more of the multiple amplitude sequences.

In an embodiment, the program code for generating for display further comprises program code for generating for display measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, the program code for generating user-apprehendable content comprises program code for displaying a user control for selecting, individually or collectively, one or more of the multiple amplitude sequences for display on the display device.

In an embodiment, the program code for generating for display on a display device comprises program code for providing a user control for zooming in on a portion of a displayed one or more amplitude sequences.

In an embodiment, the program code for generating user-apprehendable content based on the multiple amplitude sequences comprises: program code for testing the at least one amplitude sequence to generate measurements and comparing the measurements to one or more respective threshold parameters to generate a sound detection score; and program code for generating for a user a representation of the sound detection score.

In accordance with another aspect, there is provided a system for processing electronic audio signals, the system comprising a network interface for receiving digital samples generated by an audio transducer from electronic audio signals captured using an audio transducer; a frame division process for allocating sequences of the digital samples of an input electronic audio signal to respective frames; a frequency transform process for processing the digital samples by frame thereby to register, for each of the frames, a respective frequency set; a filtering process for filtering frequencies of each frequency set into a respective one of a plurality of orders based on relative prominence; an amplitude sequence process for generating multiple amplitude sequences based on the orders, each amplitude sequence n respectively comprising a sequence of amplitudes of the nth-order frequency content in the frames; and an output process for generating user-apprehendable content for a user interface of the system based on the multiple amplitude sequences.

In an embodiment, the frame division process allocates a number of digital samples to respective frames based on a configurable sampling rate and a configurable frequency transform buffer size.

In an embodiment, the frequency transform process allocates a number of frequencies to each frequency set based at least on a configurable number of frequencies per frame.

In an embodiment, the frequency transform process allocates a number of frequencies to each frequency set based at least on a configurable frequency bandwidth.

In an embodiment, the frequency transform process allocates a number of frequencies to each frequency set based at least on a configurable amplitude threshold, wherein digital samples of the electronic sound signal having an amplitude below the configurable amplitude threshold are excluded.

In an embodiment, the output process comprises a display process configured to generate for display on a display device a visual representation of one or more of the multiple amplitude sequences.

In an embodiment, the display process further displays measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, the display process is further configured to display a user control for selecting, individually or collectively, one or more of the multiple amplitude sequences for display on the display device.

In an embodiment, the display process is further configured to provide a user control for zooming in on a portion of a displayed one or more amplitude sequences.

In an embodiment, the output process comprises a test process for testing the at least one amplitude sequence to generate measurements, the test process comparing the measurements to one or more respective threshold parameters to generate a sound detection score; and a user interface process for generating for a user a representation of the sound detection score.

According to another aspect, there is provided a method for processing electronic audio signals, the method comprising causing a network interface to receive digital samples generated by an audio transducer from electronic audio signals captured using an audio transducer; allocating sequences of the digital samples of an input electronic audio signal to respective frames; processing the digital samples by frame thereby to register, for each of the frames, a respective frequency set; filtering frequencies of each frequency set into a respective one of a plurality of orders based on relative prominence; generating multiple amplitude sequences based on the orders, each amplitude sequence n respectively comprising a sequence of amplitudes of the nth-order frequency content in the frames; and generating user-apprehendable content for a user interface based on the multiple amplitude sequences.

In an embodiment, the allocating comprises allocating a number of digital samples to respective frames based on a configurable sampling rate and a configurable frequency transform buffer size.

In an embodiment, the allocating comprises allocating a number of frequencies to each frequency set based at least on a configurable number of frequencies per frame.

In an embodiment, the allocating comprises allocating a number of frequencies to each frequency set based at least on a configurable frequency bandwidth.

In an embodiment, the allocating comprises allocating a number of frequencies to each frequency set based at least on a configurable amplitude threshold, wherein digital samples of the electronic sound signal having an amplitude below the configurable amplitude threshold are excluded.

In an embodiment, generating user-apprehendable content comprises generating for display on a display device a visual representation of one or more of the multiple amplitude sequences.

In an embodiment, generating for display further comprises generating for display measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, generating user-apprehendable content comprises displaying a user control for selecting, individually or collectively, one or more of the multiple amplitude sequences for display on the display device.

In an embodiment, generating for display on a display device comprises providing a user control for zooming in on a portion of a displayed one or more amplitude sequences.

In an embodiment, generating user-apprehendable content based on the multiple amplitude sequences comprises testing the at least one amplitude sequence to generate measurements and comparing the measurements to one or more respective threshold parameters to generate a sound detection score; and generating for a user a representation of the sound detection score.

In accordance with another aspect, there is provided a non-transitory processor-readable medium embodying a computer program for processing electronic audio signals, the computer program comprising program code for causing a network interface to receive digital samples generated by an audio transducer from electronic audio signals captured using an audio transducer; program code for allocating sequences of the digital samples of an input electronic audio signal to respective frames; program code for processing the digital samples by frame thereby to register, for each of the frames, a respective frequency set; program code for filtering frequencies of each frequency set into a respective one of a plurality of orders based on relative prominence; program code for generating multiple amplitude sequences based on the orders, each amplitude sequence n respectively comprising a sequence of amplitudes of the nth-order frequency content in the frames; and program code for generating user-apprehendable content for a user interface based on the multiple amplitude sequences.

In an embodiment, the program code for allocating comprises program code for allocating a number of digital samples to respective frames based on a configurable sampling rate and a configurable frequency transform buffer size.

In an embodiment, the program code for allocating comprises program code for allocating a number of frequencies to each frequency set based at least on a configurable number of frequencies per frame.

In an embodiment, the program code for allocating comprises program code for allocating a number of frequencies to each frequency set based at least on a configurable frequency bandwidth.

In an embodiment, the program code for allocating comprises program code for allocating a number of frequencies to each frequency set based at least on a configurable amplitude threshold, wherein digital samples of the electronic sound signal having an amplitude below the configurable amplitude threshold are excluded.

In an embodiment, the program code for generating user-apprehendable content comprises program code for generating for display on a display device a visual representation of one or more of the multiple amplitude sequences.

In an embodiment, the program code for generating for display further comprises program code for generating for display measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, the program code for generating user-apprehendable content comprises program code for displaying a user control for selecting, individually or collectively, one or more of the multiple amplitude sequences for display on the display device.

In an embodiment, the program code for generating for display on a display device comprises program code for providing a user control for zooming in on a portion of a displayed one or more amplitude sequences.

In an embodiment, the program code for generating user-apprehendable content based on the multiple amplitude sequences comprises program code for testing the at least one amplitude sequence to generate measurements and comparing the measurements to one or more respective threshold parameters to generate a sound detection score; and program code for generating for a user a representation of the sound detection score.

In accordance with another aspect, there is provided a system for processing electronic audio signals, the system comprising an electronic storage system storing digital samples of electronic audio signals captured using an audio transducer; a frame division process for allocating sequences of the digital samples of an input electronic audio signal to respective frames; a frequency transform process for processing the digital samples by frame thereby to register, for each of the frames, a respective frequency set; a filtering process for filtering frequencies of each frequency set into a respective one of a plurality of orders based on relative prominence; an amplitude sequence process for generating multiple amplitude sequences based on the orders, each amplitude sequence n respectively comprising a sequence of amplitudes of the nth-order frequency content in the frames; and an output process for generating user-apprehendable content for a user interface of the system based on the multiple amplitude sequences.

In an embodiment, the frame division process allocates a number of digital samples to respective frames based on a configurable sampling rate and a configurable frequency transform buffer size.

In an embodiment, the frequency transform process allocates a number of frequencies to each frequency set based at least on a configurable number of frequencies per frame.

In an embodiment, the frequency transform process allocates a number of frequencies to each frequency set based at least on a configurable frequency bandwidth.

In an embodiment, the frequency transform process allocates a number of frequencies to each frequency set based at least on a configurable amplitude threshold, wherein digital samples of the electronic sound signal having an amplitude below the configurable amplitude threshold are excluded.

In an embodiment, the output process comprises a display process configured to generate for display on a display device a visual representation of one or more of the multiple amplitude sequences.

In an embodiment, the display process further displays measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, the display process is further configured to display a user control for selecting, individually or collectively, one or more of the multiple amplitude sequences for display on the display device.

In an embodiment, the display process is further configured to provide a user control for zooming in on a portion of a displayed one or more amplitude sequences.

In an embodiment, the output process comprises a test process for testing the at least one amplitude sequence to generate measurements, the test process comparing the measurements to one or more respective threshold parameters to generate a sound detection score; and a user interface process for generating for a user a representation of the sound detection score.

According to another aspect, there is provided a method for processing electronic audio signals, the method comprising storing digital samples of electronic audio signals captured using an audio transducer; allocating sequences of the digital samples of an input electronic audio signal to respective frames; processing the digital samples by frame thereby to register, for each of the frames, a respective frequency set; filtering frequencies of each frequency set into a respective one of a plurality of orders based on relative prominence; generating multiple amplitude sequences based on the orders, each amplitude sequence n respectively comprising a sequence of amplitudes of the nth-order frequency content in the frames; and generating user-apprehendable content for a user interface based on the multiple amplitude sequences.

In an embodiment, the allocating comprises allocating a number of digital samples to respective frames based on a configurable sampling rate and a configurable frequency transform buffer size.

In an embodiment, the allocating comprises allocating a number of frequencies to each frequency set based at least on a configurable number of frequencies per frame.

In an embodiment, the allocating comprises allocating a number of frequencies to each frequency set based at least on a configurable frequency bandwidth.

In an embodiment, the allocating comprises allocating a number of frequencies to each frequency set based at least on a configurable amplitude threshold, wherein digital samples of the electronic sound signal having an amplitude below the configurable amplitude threshold are excluded.

In an embodiment, generating user-apprehendable content comprises generating for display on a display device a visual representation of one or more of the multiple amplitude sequences.

In an embodiment, the generating for display further comprises generating for display measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, generating user-apprehendable content comprises displaying a user control for selecting, individually or collectively, one or more of the multiple amplitude sequences for display on the display device.

In an embodiment, generating for display on a display device comprises providing a user control for zooming in on a portion of a displayed one or more amplitude sequences.

In an embodiment, generating user-apprehendable content based on the multiple amplitude sequences comprises testing the at least one amplitude sequence to generate measurements and comparing the measurements to one or more respective threshold parameters to generate a sound detection score; and generating for a user a representation of the sound detection score.

In accordance with another aspect, there is provided a non-transitory processor-readable medium embodying a computer program for processing electronic audio signals, the computer program comprising program code for storing digital samples of electronic audio signals captured using an audio transducer; program code for allocating sequences of the digital samples of an input electronic audio signal to respective frames; program code for processing the digital samples by frame thereby to register, for each of the frames, a respective frequency set; program code for filtering frequencies of each frequency set into a respective one of a plurality of orders based on relative prominence; program code for generating multiple amplitude sequences based on the orders, each amplitude sequence n respectively comprising a sequence of amplitudes of the nth-order frequency content in the frames; and program code for generating user-apprehendable content for a user interface based on the multiple amplitude sequences.

In an embodiment, the program code for allocating comprises program code for allocating a number of digital samples to respective frames based on a configurable sampling rate and a configurable frequency transform buffer size.

In an embodiment, the program code for allocating comprises program code for allocating a number of frequencies to each frequency set based at least on a configurable number of frequencies per frame.

In an embodiment, the program code for allocating comprises program code for allocating a number of frequencies to each frequency set based at least on a configurable frequency bandwidth.

In an embodiment, the program code for allocating comprises program code for allocating a number of frequencies to each frequency set based at least on a configurable amplitude threshold, wherein digital samples of the electronic sound signal having an amplitude below the configurable amplitude threshold are excluded.

In an embodiment, the program code for generating user-apprehendable content comprises program code for generating for display on a display device a visual representation of one or more of the multiple amplitude sequences.

In an embodiment, the program code for generating for display further comprises program code for generating for display measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise: a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, the program code for generating user-apprehendable content comprises program code for displaying a user control for selecting, individually or collectively, one or more of the multiple amplitude sequences for display on the display device.

In an embodiment, the program code for generating for display on a display device comprises program code for providing a user control for zooming in on a portion of a displayed one or more amplitude sequences.

In an embodiment, the program code for generating user-apprehendable content based on the multiple amplitude sequences comprises: program code for testing the at least one amplitude sequence to generate measurements and comparing the measurements to one or more respective threshold parameters to generate a sound detection score; and program code for generating for a user a representation of the sound detection score.

According to another aspect, there is provided a system for processing electronic audio signals, the system comprising a network interface for receiving, over a network, an audio file containing digital samples generated by an audio transducer from electronic audio signals captured using an audio transducer; an electronic storage system storing the digital samples; a frame division process for allocating sequences of the digital samples of an input electronic audio signal to respective frames; a frequency transform process for processing the digital samples by frame thereby to register, for each of the frames, a respective frequency set; a filtering process for filtering frequencies of each frequency set into a respective one of a plurality of orders based on relative prominence; an amplitude sequence process for generating multiple amplitude sequences based on the orders, each amplitude sequence n respectively comprising a sequence of amplitudes of the nth-order frequency content in the frames; and an output process for generating user-apprehendable content for a user interface of the system based on the multiple amplitude sequences.

In an embodiment, the frame division process allocates a number of digital samples to respective frames based on a configurable sampling rate and a configurable frequency transform buffer size.

In an embodiment, the frequency transform process allocates a number of frequencies to each frequency set based at least on a configurable number of frequencies per frame.

In an embodiment, the frequency transform process allocates a number of frequencies to each frequency set based at least on a configurable frequency bandwidth.

In an embodiment, the frequency transform process allocates a number of frequencies to each frequency set based at least on a configurable amplitude threshold, wherein digital samples of the electronic sound signal having an amplitude below the configurable amplitude threshold are excluded.

In an embodiment, the output process comprises a display process configured to generate for display on a display device a visual representation of one or more of the multiple amplitude sequences.

In an embodiment, the display process further displays measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, the display process is further configured to display a user control for selecting, individually or collectively, one or more of the multiple amplitude sequences for display on the display device.

In an embodiment, the display process is further configured to provide a user control for zooming in on a portion of a displayed one or more amplitude sequences.

In an embodiment, the output process comprises a test process for testing the at least one amplitude sequence to generate measurements, the test process comparing the measurements to one or more respective threshold parameters to generate a sound detection score; and a user interface process for generating for a user a representation of the sound detection score.

According to another aspect, there is provided a method for processing electronic audio signals, the method comprising receiving, over a network, an audio file containing digital samples generated by an audio transducer from electronic audio signals captured using an audio transducer; storing the digital samples; allocating sequences of the digital samples of an input electronic audio signal to respective frames; processing the digital samples by frame thereby to register, for each of the frames, a respective frequency set; filtering frequencies of each frequency set into a respective one of a plurality of orders based on relative prominence; generating multiple amplitude sequences based on the orders, each amplitude sequence n respectively comprising a sequence of amplitudes of the nth-order frequency content in the frames; and generating user-apprehendable content for a user interface based on the multiple amplitude sequences.

In an embodiment, the allocating comprises allocating a number of digital samples to respective frames based on a configurable sampling rate and a configurable frequency transform buffer size.

In an embodiment, the allocating comprises allocating a number of frequencies to each frequency set based at least on a configurable number of frequencies per frame.

In an embodiment, the allocating comprises allocating a number of frequencies to each frequency set based at least on a configurable frequency bandwidth.

In an embodiment, the allocating comprises allocating a number of frequencies to each frequency set based at least on a configurable amplitude threshold, wherein digital samples of the electronic sound signal having an amplitude below the configurable amplitude threshold are excluded.

In an embodiment, the generating user-apprehendable content comprises generating for display on a display device a visual representation of one or more of the multiple amplitude sequences.

In an embodiment, the generating for display further comprises generating for display measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, generating user-apprehendable content comprises displaying a user control for selecting, individually or collectively, one or more of the multiple amplitude sequences for display on the display device.

In an embodiment, generating for display on a display device comprises providing a user control for zooming in on a portion of a displayed one or more amplitude sequences.

In an embodiment, the generating user-apprehendable content based on the multiple amplitude sequences comprises testing the at least one amplitude sequence to generate measurements and comparing the measurements to one or more respective threshold parameters to generate a sound detection score; and generating for a user a representation of the sound detection score.

In accordance with another aspect, there is provided a non-transitory processor-readable medium embodying a computer program for processing electronic audio signals, the computer program comprising program code for receiving, over a network, an audio file containing digital samples generated by an audio transducer from electronic audio signals captured using an audio transducer; program code for storing the digital samples; program code for allocating sequences of the digital samples of an input electronic audio signal to respective frames; program code for processing the digital samples by frame thereby to register, for each of the frames, a respective frequency set; program code for filtering frequencies of each frequency set into a respective one of a plurality of orders based on relative prominence; program code for generating multiple amplitude sequences based on the orders, each amplitude sequence n respectively comprising a sequence of amplitudes of the nth-order frequency content in the frames; and program code for generating user-apprehendable content for a user interface based on the multiple amplitude sequences.

In an embodiment, the program code for allocating comprises program code for allocating a number of digital samples to respective frames based on a configurable sampling rate and a configurable frequency transform buffer size.

In an embodiment, the program code for allocating comprises program code for allocating a number of frequencies to each frequency set based at least on a configurable number of frequencies per frame.

In an embodiment, the program code for allocating comprises program code for allocating a number of frequencies to each frequency set based at least on a configurable frequency bandwidth.

In an embodiment, the program code for allocating comprises program code for allocating a number of frequencies to each frequency set based at least on a configurable amplitude threshold, wherein digital samples of the electronic sound signal having an amplitude below the configurable amplitude threshold are excluded.

In an embodiment, the program code for generating user-apprehendable content comprises program code for generating for display on a display device a visual representation of one or more of the multiple amplitude sequences.

In an embodiment, the program code for generating for display further comprises program code for generating for display measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, the program code for generating user-apprehendable content comprises program code for displaying a user control for selecting, individually or collectively, one or more of the multiple amplitude sequences for display on the display device.

In an embodiment, the program code for generating for display on a display device comprises program code for providing a user control for zooming in on a portion of a displayed one or more amplitude sequences.

In an embodiment, the program code for generating user-apprehendable content based on the multiple amplitude sequences comprises program code for testing the at least one amplitude sequence to generate measurements and comparing the measurements to one or more respective threshold parameters to generate a sound detection score; and program code for generating for a user a representation of the sound detection score.

According to another aspect, there is provided a system for processing electronic audio signals, the system comprising an input process for receiving digital samples of an electronic audio signal; a frame division process for allocating sequences of the digital samples of the electronic audio signal to respective frames; a frequency transform process for processing the digital samples by frame thereby to register, for each of the frames, a respective frequency set; a filtering process for filtering frequencies of each frequency set into a respective one of a plurality of orders based on relative prominence; an amplitude sequence process for generating multiple amplitude sequences based on the orders, each amplitude sequence n respectively comprising a sequence of amplitudes of the nth-order frequency content in the frames; and an output process for generating user-apprehendable content for a user interface of the system based on the multiple amplitude sequences.

In an embodiment, the frame division process allocates a number of digital samples to respective frames based on a configurable sampling rate and a configurable frequency transform buffer size.

In an embodiment, the frequency transform process allocates a number of frequencies to each frequency set based at least on a configurable number of frequencies per frame.

In an embodiment, the frequency transform process allocates a number of frequencies to each frequency set based at least on a configurable frequency bandwidth.

In an embodiment, the frequency transform process allocates a number of frequencies to each frequency set based at least on a configurable amplitude threshold, wherein digital samples of the electronic sound signal having an amplitude below the configurable amplitude threshold are excluded from the processing.

In an embodiment, the output process comprises a display process configured to generate for display on a display device a visual representation of one or more of the multiple amplitude sequences.

In an embodiment, the display process further displays measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, the display process is further configured to display a user control for selecting, individually or collectively, one or more of the multiple amplitude sequences for display on the display device.

In an embodiment, the display process is further configured to provide a user control for zooming in on a portion of a displayed one or more amplitude sequences.

In an embodiment, the output process comprises a test process for testing the at least one amplitude sequence to generate measurements, the test process comparing the measurements to one or more respective threshold parameters to generate a sound detection score; and a user interface process for generating for a user a representation of the sound detection score.

According to another aspect, there is provided a method for processing electronic audio signals, the method comprising receiving digital samples of an electronic audio signal; allocating sequences of the digital samples of the electronic audio signal to respective frames; processing the digital samples by frame thereby to register, for each of the frames, a respective frequency set; filtering frequencies of each frequency set into a respective one of a plurality of orders based on relative prominence; generating multiple amplitude sequences based on the orders, each amplitude sequence n respectively comprising a sequence of amplitudes of the nth-order frequency content in the frames; and generating user-apprehendable content for a user interface based on the multiple amplitude sequences.

In an embodiment, the allocating comprises allocating a number of digital samples to respective frames based on a configurable sampling rate and a configurable frequency transform buffer size.

In an embodiment, the allocating comprises allocating a number of frequencies to each frequency set based at least on a configurable number of frequencies per frame.

In an embodiment, the allocating comprises allocating a number of frequencies to each frequency set based at least on a configurable frequency bandwidth.

In an embodiment, the allocating comprises allocating a number of frequencies to each frequency set based at least on a configurable amplitude threshold, wherein digital samples of the electronic sound signal having an amplitude below the configurable amplitude threshold are excluded.

In an embodiment, the generating user-apprehendable content comprises generating for display on a display device a visual representation of one or more of the multiple amplitude sequences.

In an embodiment, the generating for display further comprises generating for display measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, generating user-apprehendable content comprises displaying a user control for selecting, individually or collectively, one or more of the multiple amplitude sequences for display on the display device.

In an embodiment, the generating for display on a display device comprises providing a user control for zooming in on a portion of a displayed one or more amplitude sequences.

In an embodiment, the generating user-apprehendable content based on the multiple amplitude sequences comprises testing the at least one amplitude sequence to generate measurements and comparing the measurements to one or more respective threshold parameters to generate a sound detection score; and generating for a user a representation of the sound detection score.

In accordance with another aspect, there is provided a non-transitory processor-readable medium embodying a computer program for processing electronic audio signals, the computer program comprising program code for receiving digital samples of an electronic audio signal; program code for allocating sequences of the digital samples of the electronic audio signal to respective frames; program code for processing the digital samples by frame thereby to register, for each of the frames, a respective frequency set; program code for filtering frequencies of each frequency set into a respective one of a plurality of orders based on relative prominence; program code for generating multiple amplitude sequences based on the orders, each amplitude sequence n respectively comprising a sequence of amplitudes of the nth-order frequency content in the frames; and program code for generating user-apprehendable content for a user interface based on the multiple amplitude sequences.

In an embodiment, the program code for allocating comprises program code for allocating a number of digital samples to respective frames based on a configurable sampling rate and a configurable frequency transform buffer size.

In an embodiment, the program code for allocating comprises program code for allocating a number of frequencies to each frequency set based at least on a configurable number of frequencies per frame.

In an embodiment, the program code for allocating comprises program code for allocating a number of frequencies to each frequency set based at least on a configurable frequency bandwidth.

In an embodiment, the program code for allocating comprises program code for allocating a number of frequencies to each frequency set based at least on a configurable amplitude threshold, wherein digital samples of the electronic sound signal having an amplitude below the configurable amplitude threshold are excluded.

In an embodiment, the program code for generating user-apprehendable content comprises program code for generating for display on a display device a visual representation of one or more of the multiple amplitude sequences.

In an embodiment, the program code for generating for display further comprises program code for generating for display measurements corresponding to the displayed one or more amplitude sequences on the display device.

In an embodiment, the measurements comprise frequency values for each frequency for which an amplitude is being displayed by the display process.

In an embodiment, the measurements comprise a repetition count for each frequency value for which an amplitude is being displayed by the display process.

In an embodiment, the measurements comprise a total number of frames for which an amplitude is being displayed by the display process.

In an embodiment, the measurements comprise an identification of a strongest frequency for which an amplitude is being displayed by the display process, wherein the strongest frequency is a frequency with the highest sum of amplitudes from all amplitude sequences being displayed on the display device.

In an embodiment, the measurements comprise an identification of a single frequency for which an amplitude is being displayed by the display process in longest unbroken succession across frames of an amplitude sequence.

In an embodiment, the measurements comprise a frequency having the maximum amplitude of frequencies for which an amplitude is being displayed by the display process; and the maximum amplitude.

In an embodiment, the measurements comprise a total count of amplitude oscillations present in the displayed one or more amplitude sequence.

In an embodiment, the total count of amplitude oscillations is based at least on a configurable oscillation amplitude threshold.

In an embodiment, the measurements comprise a total count of frequencies present in the displayed one or more amplitude sequence.

In an embodiment, the measurements comprise a total count of error frames corresponding to the displayed one or more amplitude sequences.

In an embodiment, the measurements comprise a total count of increasing frames in a first part of the displayed one or more amplitude sequences.

In an embodiment, the measurements comprise a total count of decreasing frames in a first part of the displayed one or more amplitude sequences.

In an embodiment, the program code for generating user-apprehendable content comprises program code for displaying a user control for selecting, individually or collectively, one or more of the multiple amplitude sequences for display on the display device.

In an embodiment, the program code for generating for display on a display device comprises program code for providing a user control for zooming in on a portion of a displayed one or more amplitude sequences.

In an embodiment, the program code for generating user-apprehendable content based on the multiple amplitude sequences comprises: program code for testing the at least one amplitude sequence to generate measurements and comparing the measurements to one or more respective threshold parameters to generate a sound detection score; and program code for generating for a user a representation of the sound detection score.

According to another aspect, there is provided a system for generating a sound detection score, the system comprising an input process for receiving digital samples of an electronic audio signal; a transform process for transforming the digital samples into a plurality of amplitude sequences, each amplitude sequence n respectively comprising a sequence of amplitudes of the nth-most prominent frequency content in frames of the electronic audio signal; a test process for testing the at least one amplitude sequence to generate measurements, the test process comparing the measurements to one or more respective threshold parameters to generate a sound detection score; and a configuration process for configuring the transform process and the test process prior to the transforming and processing using the one or more parameters corresponding to a reference audio signal.

In an embodiment, the transform process comprises a frame division process for allocating sequences of the digital samples of the electronic audio signal to respective frames; a frequency transform process for processing the digital samples by frame thereby to register, for each of the frames, a respective frequency set; a filtering process for filtering frequencies of each frequency set into a respective one of a plurality of orders based on relative prominence; an amplitude sequence process for generating multiple amplitude sequences based on the orders, each amplitude sequence n respectively comprising a sequence of amplitudes of the nth-order frequency content in the frames; and an output process for generating user-apprehendable content for a user interface of the system based on the multiple amplitude sequences.

In an embodiment, the frame division process allocates a number of digital samples to respective frames based on a configurable sampling rate and a configurable sampling buffer size.

In an embodiment, the frequency transform process allocates a number of frequencies to each frequency set based at least on a configurable number of frequencies per frame.

In an embodiment, the frequency transform process allocates a number of frequencies to each frequency set based at least on a configurable frequency bandwidth.

In an embodiment, the frequency transform process allocates a number of frequencies to each frequency set based at least on a configurable amplitude threshold, wherein digital samples of the electronic sound signal having an amplitude below the configurable amplitude threshold are excluded from the processing.

In an embodiment, the system further comprises a data structure storing the transform, test and threshold parameters in association with respective reference sound identifiers, the configuration process accessing the data store and conducting the automatic configuring in response to a request for configuration.

In accordance with another aspect, there is provided a processor-implemented method for generating a sound detection score, the method comprising receiving digital samples of an input electronic audio signal; configuring both a transform process and a test process in accordance with a plurality of parameters corresponding to a reference audio signal; providing the digital samples to the configured transform process thereby to transform the digital samples into at least one amplitude sequence, each amplitude sequence n respectively comprising a sequence of amplitudes of the nth-most prominent frequency content in frames of the input electronic sound signal; providing the at least one amplitude sequence to the configured test process thereby to generate a sound detection score, the configured test process: measuring the provided at least one amplitude sequence to generate measurements; and comparing the measurements to one or more threshold parameters that correspond to the reference sound; and generating user-apprehendable content for a user interface based on the sound detection score.

In an embodiment, the configured transform process comprises a frame division process for allocating sequences of the digital samples of the electronic audio signal to respective frames; a frequency transform process for processing the digital samples by frame thereby to register, for each of the frames, a respective frequency set; a filtering process for filtering frequencies of each frequency set into a respective one of a plurality of orders based on relative prominence; and an amplitude sequence process for generating the multiple amplitude sequences based on the orders.

In an embodiment, the configured transform process transforms the input sound signal into multiple amplitude sequences.

In an embodiment, the parameters comprises a number of frames for the at least one amplitude sequence.

In an embodiment, the parameters comprises a frequency bandwidth for the at least one amplitude sequence.

In an embodiment, the one or more test parameters comprises an identification of which of a plurality of available tests to execute.

In accordance with another aspect, there is provided a non-transitory processor-readable medium embodying a computer program for generating a sound detection score, the computer program comprising program code for receiving digital samples of an input electronic audio signal; program code for configuring both a transform process and a test process in accordance with a plurality of parameters corresponding to a reference audio signal; program code for providing the digital samples to the configured transform process thereby to transform the digital samples into at least one amplitude sequence, each amplitude sequence n respectively comprising a sequence of amplitudes of the nth-most prominent frequency content in frames of the input electronic sound signal; program code for providing the at least one amplitude sequence to the configured test process thereby to generate a sound detection score, the configured test process comprising: program code for measuring the provided at least one amplitude sequence to generate measurements; and program code for comparing the measurements to one or more threshold parameters that correspond to the reference sound; and program code for generating user-apprehendable content for a user interface based on the sound detection score.

In an embodiment, the configured transform process comprises a frame division process for allocating sequences of the digital samples of the electronic audio signal to respective frames; a frequency transform process for processing the digital samples by frame thereby to register, for each of the frames, a respective frequency set; a filtering process for filtering frequencies of each frequency set into a respective one of a plurality of orders based on relative prominence; and an amplitude sequence process for generating the multiple amplitude sequences based on the orders.

In an embodiment, the configured transform process transforms the input sound signal into multiple amplitude sequences.

In an embodiment, the parameters comprises a number of frames for the at least one amplitude sequence.

In an embodiment, the parameters comprises a frequency bandwidth for the at least one amplitude sequence.

In an embodiment, the one or more test parameters comprises an identification of which of a plurality of available tests to execute.

Other aspects and embodiments are described and depicted herein.

BRIEF DESCRIPTION OF THE DRAWINGS

Embodiments of the invention will now be described with reference to the appended drawings in which:

FIG. 4 is a representation of test regime tables stored in association with sound profiles in the local database of the sound identification system of FIG. 1;

DETAILED DESCRIPTION

Figure 1:
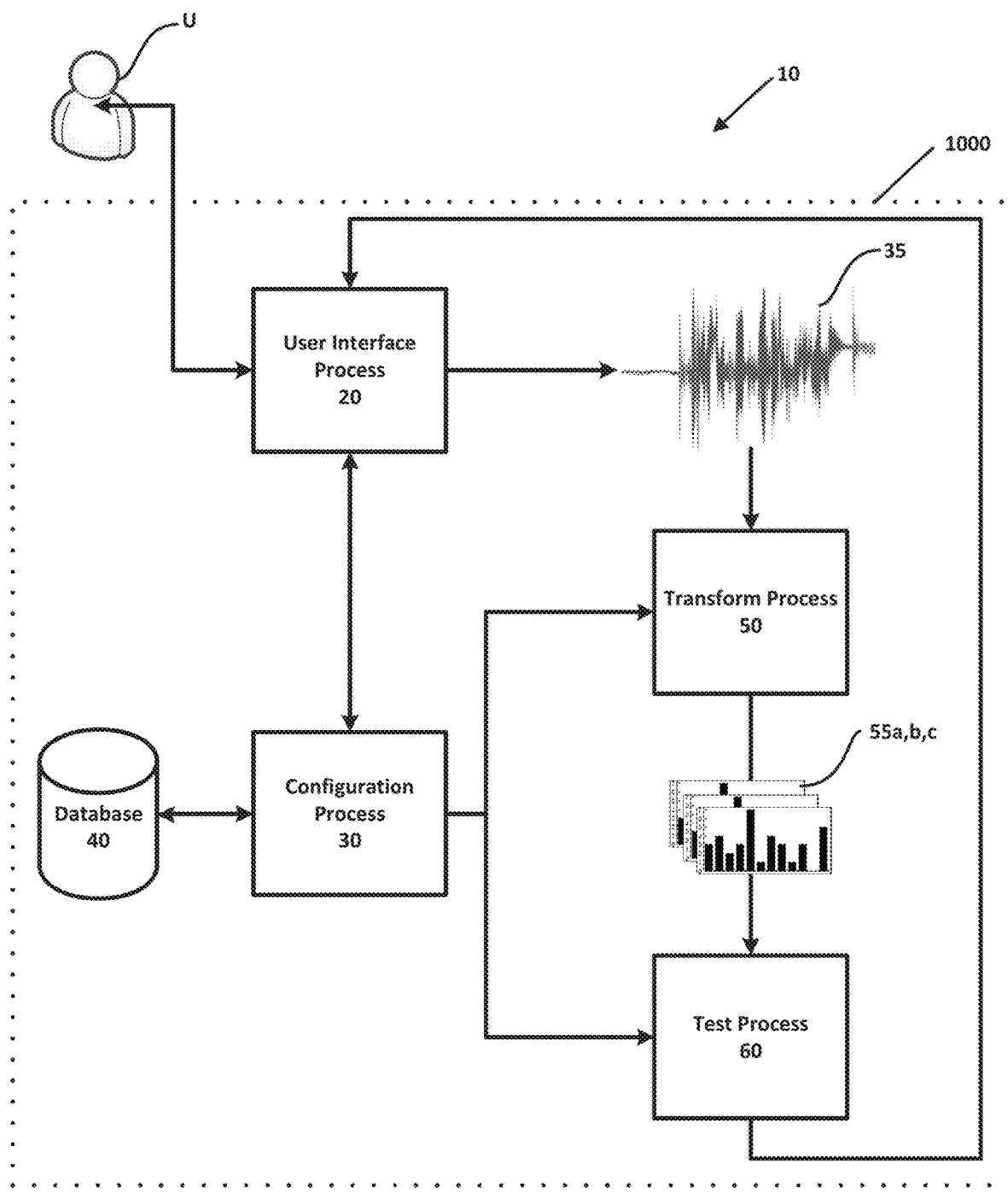
FIG. 1 is a schematic diagram of a sound identification system, according to an embodiment.

FIG. 1 is a schematic diagram of a sound identification system 10, according to an embodiment. In this embodiment, sound identification system 10 is contained within a single computing system 1000, for example a smartphone, and contains a number of processes for handling operation of the sound identification system 10. In this embodiment, sound identification system 10 includes a user interface process 20 with a number of sub-processes for interacting with a user U. User interface process 20, for example, requests permission of the operator of computing system 1000 to access the local default audio transducer—in this embodiment a microphone—of computing system 1000 in order to exercise control over capture of a sound sample from the user U for use by a downstream process. User interface process 20, in this embodiment, also interacts with user U to receive from user U a selection of a sound sample to be tested, so that upon receipt by the user of a sound sample the downstream processes are configured to conduct appropriate transformations of the sound sample for testing, and are able to conduct tests on the transformation appropriate to the sound to be tested.

Figure 2:
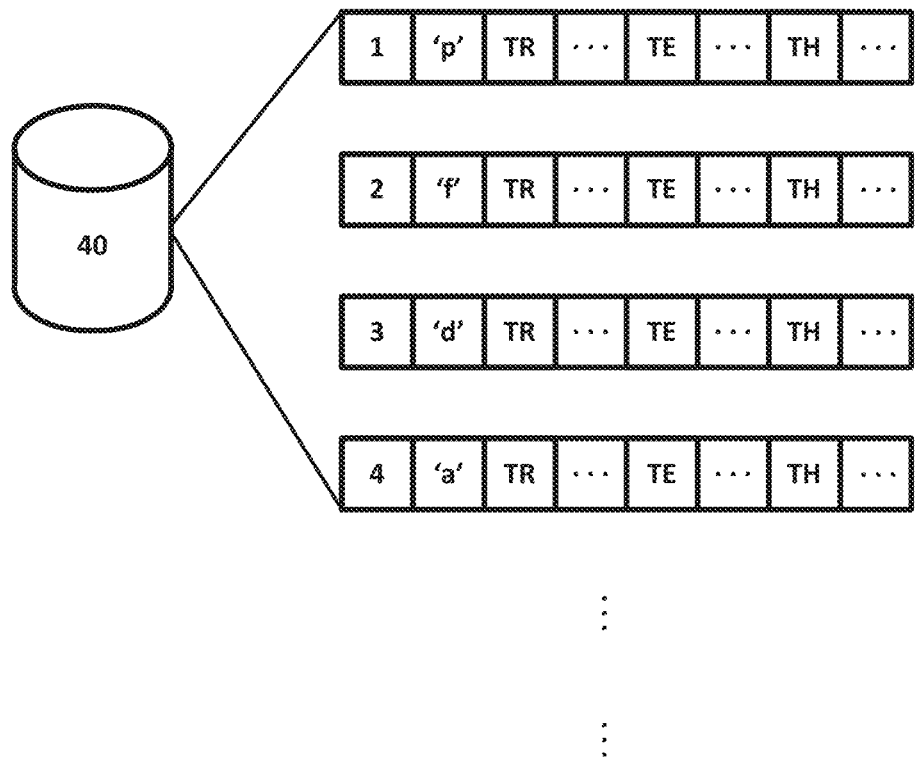
FIG. 2 is a representation of a number of sound profiles stored in a local database of the sound identification system of FIG. 1, according to an embodiment.

User interface process 20 is in communication with a configuration process 30. Configuration process 30 receives a user selection from user interface process 20 as to a selected sound to be tested and, in turn, retrieves from a local database 40 a reference soundProfile for the selected sound. In this embodiment, a soundProfile is a set of multiple types of parameters pertinent to configuring the sound identification system 10 to identify a particular sound in a given sound sample. In this embodiment, the types of parameters are: basic parameters, transform parameters, test parameters, and threshold parameters. FIG. 2 is a representation of a number of sound profiles stored in local database 40 of the sound identification system 10, each having sets of these parameters, according to an embodiment. Each of these parameters is for equipping sound identification system 10 as an expert system for a particular sound. As will be described, the structure of sound identification system 10 is amenable to transformation, through parameters alone, into an expert system for testing a wide variety of short sounds. This amenability to transformation is very useful for detecting short sounds, because a researcher studying a particular sound for producing a new soundProfile is able to prepare a representation of the sound that maximizes its distinctiveness—whether by representing it using more or fewer frames, more or fewer frequency bands, one or more transformations into amplitude sequences, and so forth. In this way, a soundProfile can be prepared that configures sound identification system 10 to make transformations of and conduct tests on a given sound sample in a manner that can discern based on the maximized distinctiveness.

In particular, transform parameters are for enabling configuration process 30 to configure a transform process 50 so that transform process 50 is able to produce a particular transformation of an incoming sound sample suitable for testing by a downstream test process 60. In this embodiment, transform process 50 transforms an incoming sound sample into at least one amplitude sequence. In this embodiment, each amplitude sequence n respectively comprises a sequence of amplitudes of the nth-most prominent frequency content in frames of the input sound signal. By forming amplitude sequences into which frequency content of frames is filtered by prominence, the core meaning or content of the sound—the information portion—can be separated from the non-core content of the sound—the content attributable more to the sound generating apparatus used to form the information portion or to background noise. Separation by such prominence filtering provides a powerful tool for enhancing "signal-to-noise" when examining or testing for core content, but also for preserving the non-core content so that information relating to the sound generating apparatus can be explored or analyzed. An audio file may be transformed to be prominence-filtered into several amplitude sequences. As such, transform parameters include the parameter n: the number of different amplitude sequences into which a given sound sample will be transformed. The transform parameters also include a bandwidth parameter: a value indicative of how the frequency band is to be divided during the transformation, so as to distinguish between different frequencies for the amplitude sequences. The transform parameters also include a frame length parameter: a value indicative of the duration of a frame for the transformation. It will be understood that two different sounds may require two different transformations of respective incoming sound samples, for example fewer or more different amplitude sequences, wider or narrower bandwidth, and longer or shorter frame durations. As such, sound identification system 10 is capable, through the parameterization of not only a reference sound itself, but the transformation of the incoming sound sample pre-testing, of creating a very wide range of testable transformations of an incoming sound signal.

The purpose of transforming an incoming sound sample into more than one amplitude sequence is to provide sound identification system 10 with more insight into an incoming sound than is typically available in a single-order analysis. By generating at least a second-, and possibly additional order amplitude sequences, sound identification system 10 is able to conduct tests on more sequences for the same sound thereby, in some cases, to distinguish between two sounds whose first-order amplitude sequences will have almost identical behaviours. For example, it has been found that the "Th" noise and "Th" quiet can generally have similar-behaving first-order amplitude sequences (similar oscillations, frequencies, and/or amplitudes etc.), with second-order amplitude sequences that are very distinct from each other (dissimilar oscillations, frequencies, and/or amplitudes etc.), such that discerning between the two is advantageously done primarily based on their respective second-order amplitude sequences. That is, while some sounds are distinguishable by first order behaviour alone, others are not. As such, the production of amplitude sequences, and the other features and patterns disclosed herein, provide a large array of processor-discernable aspects, from which different types of information carried within the raw audio signal can be discerned.

Furthermore, the architecture described herein facilitates granular control over how transformation and testing are done so as to accommodate accurate testing for a large variety of short sounds while using a small base of configurable and therefore widely-applicable standard count tests, requiring a very small computer memory footprint and no network access during testing of the short sounds to a remote datastore, with rapid feedback, as compared to machine-learning environments. For example, the amount of memory required of a sound identification system 10 running on an Apple iPhone 6 smartphone to be capable of identifying 38 sounds is, in an embodiment, between 48 and 65 Mb or less. The average time to accurate identification is substantially in real-time, and particularly generally between 10 and 50 milliseconds. As such, sound identification system 10 can leverage the processing power and memory of an average personal computing device, and is thus more widely deployable to students.

Figure 3:
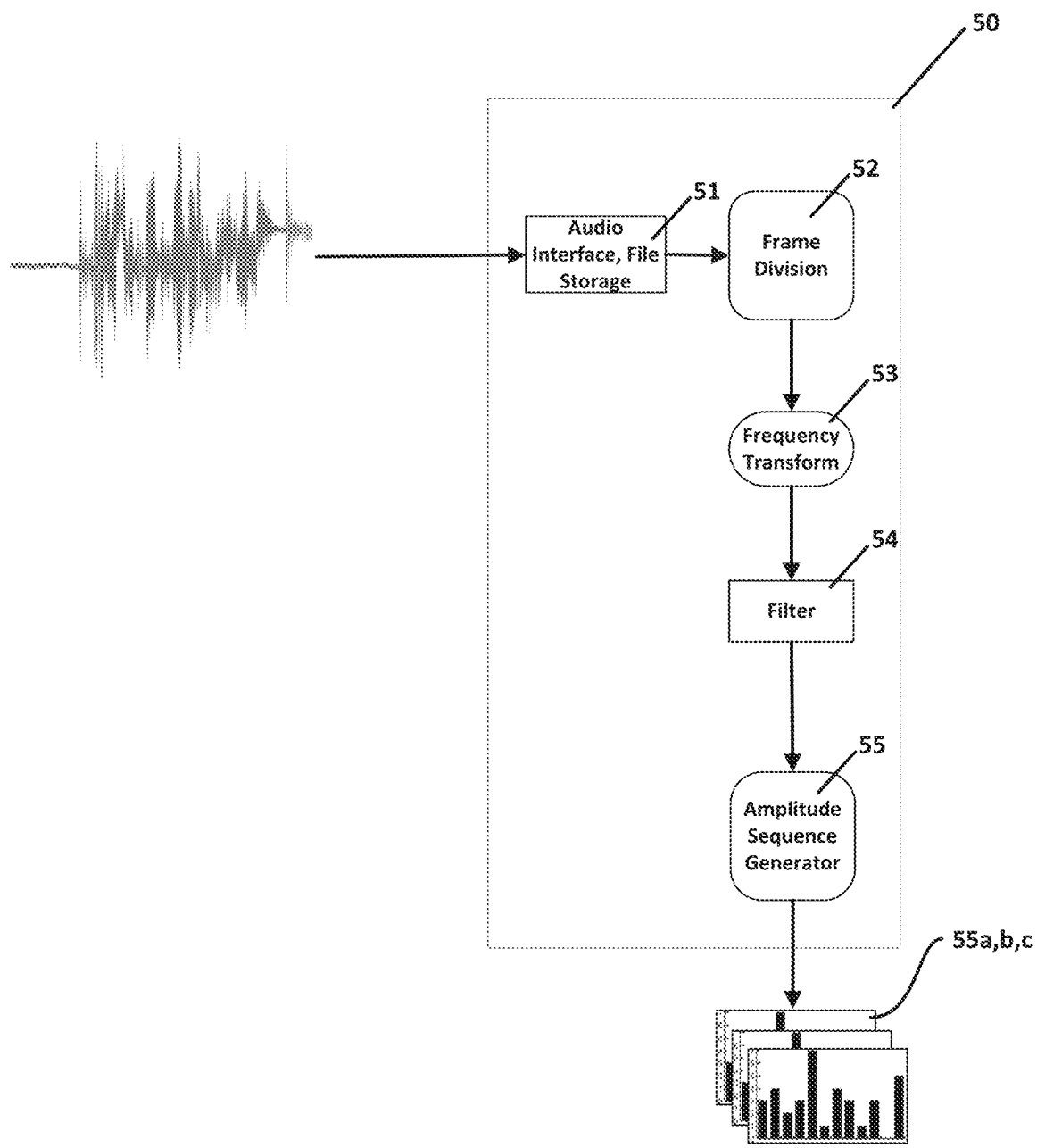
FIG. 3 is a schematic diagram of an audio interface and components of a transform process for filtering of an electronic audio signal, according to an embodiment.

FIG. 3 is a schematic diagram of an audio interface 51 and components 52 through 55 of transform process 50 for filtering of an electronic audio signal. Components 52 through 55 cooperate to generate the multiple amplitude sequences based on relative prominence of frequency content in frames of the electronic audio signal. In particular, a frame division process 52 allocates sequences of digital samples of an input electronic audio signal to respective frames, so that the samples associated with the frames may be processed together to identify frequencies therein. An FFT (Fast Fourier Transform) process 53 processes the digital samples by frame thereby to register, for each of the frames, a respective frequency set. Thus, depending on parameters, each frame can be associated with one or more frequencies and their amplitudes in the frame. A filtering process 54 filters frequencies of each frequency set into a respective one of a plurality of orders based on relative prominence. In this way, the frequencies and their amplitudes of each frame take on membership in an order for downstream processing. An amplitude sequence process 55 generates multiple amplitude sequences based on the orders, each amplitude sequence n respectively comprising a sequence of amplitudes of the nth-order frequency content in the frames. As such, contours of amplitudes, oscillations and the like can be processed along a particular order with the other orders filtered out, so as provide opportunity to hone in on core content of a sound that can be discerned from the a given amplitude sequence. In this application, the core content of the sound refers to the content that, for example in spoken audio, can best indicate what short sound the speaker has set out to utter, such as a "bee" or a "buh", itself isolated from non-core content. In this application, non-core content includes background noise, but also content that, for spoken audio, is more indicative of the nature of the person making the utterance (age, sex, throat, lips, tongue sizes and configurations etc.) than of what the speaker has set out to utter. More generally, the configuration of the physical apparatus used to produce the sound.

The output of the amplitude sequence process 55 can be provided to one or more output processes, as will be described, for generating user-apprehendable content based on the multiple amplitude sequences. Such user-apprehendable content is any content that can be recognized by a human user as produced by the system, such as visual or audio feedback regarding the multiple amplitude sequences themselves, or visual or audio feedback regarding testing done pursuant to the generation of the multiple amplitude sequences.

For example, in this embodiment, with a sound sample having been transformed into one or more amplitude sequences, the amplitude sequence(s) can be subjected to a test process 60. Configuration process 30, using test and threshold parameters each also associated with the sound profile, configures test process 60 to conduct specified tests on the amplitude sequence(s) using specified thresholds.

Test process 60 is configured, using test parameters, with a test regime. A test regime specifies a set of tests to be conducted. Test process 60 itself incorporates a number of selectable tests, structured as 'count' tests, and the test parameters for a particular sound include a selection of which of the selectable tests to execute on a given amplitude sequence—a test regime—into which a sound sample has been transformed. FIG. 4 is a representation of test regime tables stored in association with sound profiles in the local database 40 of sound identification system 10. In this embodiment, the selectable tests are as follows, and are each based on collecting counts of various features and patterns of the amplitude sequences, and comparing those counts to specified thresholds to determine whether the test has been satisfied.

T1: CorrectValidFrames. This test outputs a TRUE or FALSE depending on whether the number of frames in an amplitude sequence containing frequency content that is both within a frequency range and within an amplitude range, is within a particular count range. Test T1 itself is configurable using test parameters for a particular sound, and the particular count range is a threshold parameter. As such, test parameters will specify the frequency range and the amplitude range within which content of a frame will have to be in order to constitute an increase in the count for this test. Once the amplitude sequence has been processed to derive such a count, the count is compared to the threshold parameter for count corresponding to the sound. In the event that the count is within the count range then this test outputs a TRUE, and otherwise this test outputs a FALSE. The count range may be specified solely as a single range boundary (such as a minimum count), or as both ends of the range.

T2: CorrectOscillation. This test outputs a TRUE or FALSE depending on whether the number of oscillations within a particular time frame is within a particular count range. Test T2 itself is configurable using test parameters for a particular sound, and the particular count range is a threshold parameter. An oscillation, in this context, is defined as a threshold change in amplitude between frames in a given amplitude sequence into which a sound sample has been transformed. That is, if the amplitude of frame X+1 differs by a threshold amount from the amplitude of frame X, then the count is increased. As such, test parameters will specify the time frame for the set of frames within the amplitude sequence which are to be tested, and the threshold difference in amplitude that will constitute an increase in count for this test. In this embodiment, test parameters for this test will also specify the tolerance of the test to the presence of invalid frames when determining inter-frame changes in amplitude. For example, if the tolerance test parameter is 1, then during the counting the inter-frame comparison between amplitude of a first frame and that of a subsequent invalid frame is tolerated such that it is the next frame subsequent to the invalid frame with which the amplitude comparison is made. However, if that next frame is itself invalid, then the test itself is considered invalid and CorrectOscillation is automatically set to FALSE. The tolerance may be set to more or less than 1 frame. For example, if the tolerance is set to 0 frames, CorrectOscillation is automatically set to FALSE in the event that any invalid frames occur during the time frame. The count range may be specified solely as a single range boundary (such as a minimum count), or as both ends of the range.

T3: CorrectFrequencyDiversity. This test outputs a TRUE or FALSE depending on whether the count of different frequencies represented in the amplitude sequence is within a particular count range. It will be understood that this count, like other test counts, will depend on the actual transformation applied by transform process 50 according to transform parameters for the sound sample to produce the one or more amplitude sequences, and particularly the bandwidth parameter. It will be understood that, generally-speaking, a higher bandwidth parameter (meaning a wider bandwidth) for the transform process will result in a lower count of frequency variety, since the occurrence of similar but different frequencies may be lumped together in a particular band and thus may count, in this test, as a single frequency. However, such a higher bandwidth parameter can be useful for gathering frequency content for amplitude difference measurements and the like. That is, simply controlling the frequency variety at the transform process stage may otherwise obfuscate inter-frame differences in amplitude of the amplitude sequences. The count range may be specified solely as a single range boundary (such as a minimum count), or as both ends of the range.

T4: CorrectIncrease. This test outputs a TRUE or FALSE depending on whether the number of inter-frame amplitude increases within a particular time frame, when testing the amplitude of frequency content of a frame X against the amplitude of frequency content of a frame X+1, is within a particular count range. Test T4 itself is configurable using test parameters for a particular sound, and the particular count range is a threshold parameter. An increase, in this context, is defined as a threshold increase in amplitude between frames in a given amplitude sequence into which a sound sample has been transformed. That is, if the amplitude of frame X+1 is greater by a threshold amount from the amplitude of frame X, then the count is increased. As such, test parameters will specify the time frame for the set of frames within the amplitude sequence which are to be tested, and the threshold increase in amplitude that will constitute an increase in count for this test. The count range may be specified solely as a single range boundary (such as a minimum count), or as both ends of the range. In this embodiment, test parameters for this test will also specify the tolerance of the test to the presence of invalid frames when determining inter-frame increases in amplitude. For example, if the tolerance test parameter is 1, then during the counting the inter-frame comparison between amplitude of a first frame and that of a subsequent invalid frame is tolerated such that it is the next frame subsequent to the invalid frame with which the amplitude comparison is made. However, if that next frame is itself invalid, then the test itself is considered invalid and CorrectIncrease is automatically set to FALSE. The tolerance may be set to more or less than 1 frame. For example, if the tolerance is set to 0 frames, CorrectIncrease is automatically set to FALSE in the event that any invalid frames occur during the time frame.

T5: CorrectDecrease. This test outputs a TRUE or FALSE depending on whether the number of inter-frame amplitude decreases within a particular time frame, when testing the amplitude of frequency content of a frame X against the amplitude of frequency content of a frame X+1, is within a particular count range. Test T4 itself is configurable using test parameters for a particular sound, and the particular count range is a threshold parameter. A decrease, in this context, is defined as a threshold decrease in amplitude between frames in a given amplitude sequence into which a sound sample has been transformed. That is, if the amplitude of frame X+1 is less by a threshold amount than the amplitude of frame X, then the count is increased. As such, test parameters will specify the time frame for the set of frames within the amplitude sequence which are to be tested, and the threshold decrease in amplitude that will constitute an increase in count for this test. The count range may be specified solely as a single range boundary (such as a minimum count), or as both ends of the range. In this embodiment, test parameters for this test will also specify the tolerance of the test to the presence of invalid frames when determining inter-frame decreases in amplitude. For example, if the tolerance test parameter is 1, then during the counting the inter-frame comparison between amplitude of a first frame and that of a subsequent invalid frame is tolerated such that it is the next frame subsequent to the invalid frame with which the amplitude comparison is made. However, if that next frame is itself invalid, then the test itself is considered invalid and CorrectDecrease is automatically set to FALSE. The tolerance may be set to more or less than 1 frame. For example, if the tolerance is set to 0 frames, CorrectDecrease is automatically set to FALSE in the event that any invalid frames occur during the time frame. It will be understood that the tolerance for CorrectDecrease may be different than the tolerance for CorrectIncrease.

T6: CorrectErrorFrames. This test outputs a TRUE or FALSE depending on whether the number of error frames within an amplitude sequence is within a particular count range. An error frame is one that appears between valid frames having a lower than valid amplitude (i.e. zero frames), and a threshold number of error frames provides an indication that the user being tested has not spoken with sufficient power.

Application of weights, in order to generate a confidence score, may be provided in a number of ways. For example, weights may be applied to the TRUE or FALSE statements by considering a TRUE to be a test score of 100 and a FALSE to be at test score of 0, with applicable weights applied to the test score. For example, if test T1, T3, T5 and T6 are to be conducted, and corresponding weights are: 50, 20, 20, 10, then test outcomes of TRUE, TRUE, FALSE, FALSE would result in an overall confidence score of (100(0.5)+100(0.2)+0(0.2)+0(0.1))=70.

Another application of weights would be to provide test parameters for each test that would incorporate the importance of the particular test to the identification of the particular sound. In fact, this could be done by conducting all tests available, but weighting certain non-determinative tests with 0 weight as a test parameter. It will be understood that various ways by which weighting could be done.

Figure 5:
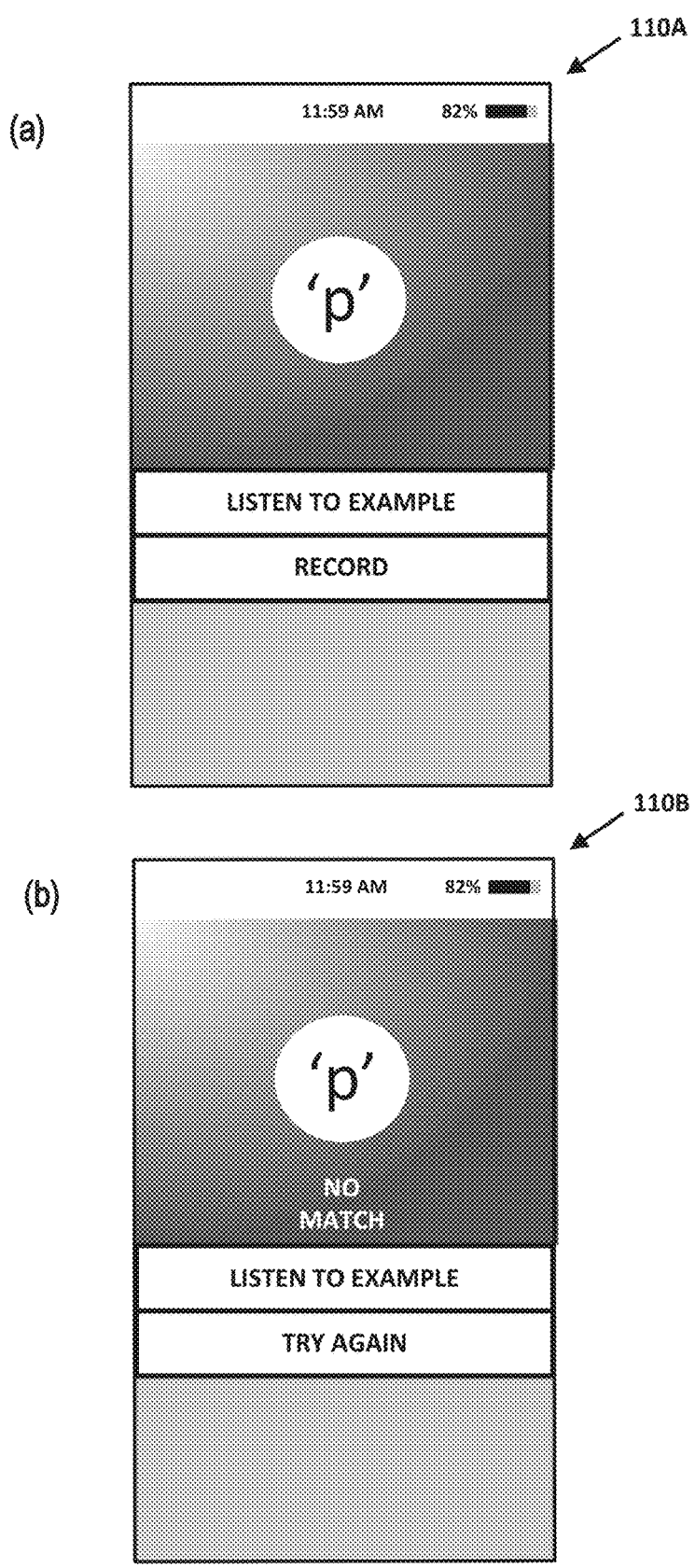
FIGS. 5A and 5B are screenshots of a smartphone user interface for testing of a sound sample and providing a user with the option to play an example sound.

During operation of sound identification system 10, a user interacts with user interface process 20 in order to select a short sound to practice or to be tested on. FIGS. 5A and 5B are screenshots of a smartphone user interface for testing of a sound sample and providing a user with the option to play an example sound. A list of short sounds is made available to the user for selection from a query to local database 40 for populating the selections for the user. In particular, if there are 10 sound profiles stored in local database 40, then the user will be presented by user interface process 20 with a list of 10 sound names, each associated with respective sound-IDs to uniquely identify the sound profile and related records in the local database 40. Upon selection of a particular sound name via user interface process 20, user interface process 20 instructs configuration process 20 to retrieve the sound profile record corresponding to the soundID of the sound name that was selected. It will be understood that sound profile records may be categorized using a category identifier, which itself is associated in a record with a category name. Examples of categories in a phoneme identification context would be 'man', 'woman', 'child'. In this example, there would be stored in local database 40 three (3) sound profile records for the 'p' phoneme, three (3) sound profile records for the 'f' phoneme, and so forth. In this way, using user interface process 20, a user can specify whether the person being tested or trained is a man, woman, or child and the correct sound profile record can be retrieved so that transform, test and threshold parameters can be correctly retrieved and applied by configuration process 30 for configuring the transform process 50 and the test process 60 for operation.

Upon retrieval of the selected sound profile record, configuration process 30 configures transform process 50 and test process 60 according to parameters parsed by configuration process 30 from the retrieved sound profile record. The retrieved sound profile record has a fixed set of fields with values corresponding to particular transform and test parameters.

The various parameters are maintained within a soundProfile record for enabling an incoming sound sample to be properly transformed and tested. In this embodiment, basic parameters include those parameters that establish the database uniqueness of a given sound record and those that categorize a sound. Transform parameters specify how the transform process 50 is to transform an incoming sound sample to produce one or more amplitude sequences. Test parameters specify how the test process 60 is to be configured to conduct particular tests of the one or more amplitude sequences, and threshold parameters specify the thresholds against which the test results are to be compared.

Basic parameters for a soundProfile record, in this embodiment, are shown in Table 1, below.

TABLE 1

Basic Parameters

| | Parameter Name | Description |
|---|---|---|
| A | SoundID | Unique ID for the sound record. |
| B | Sound Name | Name of sound (ex. 'f') |
| C | Category | Category of sound (ex. Male, Female, Child) |

Transform parameters for a soundProfile record, in this embodiment, are shown in Table 2, below.

TABLE 2

Transform Parameters

| | Parameter Name | Description |
|---|---|---|
| D1 | Buffer Size | Number of samples per frame for Fast Frequency Transform (FFT) |
| D2 | Sampling Rate | Rate of sampling (samples/second) i.e. 44,100 Hz for example. |
| E | Frame Size | The duration of a frame in the amplitude sequences. |
| F | Orders | Number of amplitude sequences to be generated. |
| G | Bandwidth | Size of frequency bands |

Test and threshold parameters for a soundProfile record, in this embodiment, are shown in Table 3, below.

TABLE 3

Test and Threshold Parameters

| | Parameter Name | Description |
|---|---|---|
| H | Valid Frame Count Min | Minimum count of valid frames for valid frames test |
| I | Valid Frame Count Max | Maximum count of valid frames for valid frames test |
| J | Valid Frame Freq Min | Minimum frequency of a valid frame in an ampl. seq. |
| K | Valid Frame Freq Max | Maximum frequency of a valid frame in an ampl. seq. |
| L | Valid Frame Ampl. Min | Minimum amplitude of a valid frame in an ampl. seq. |
| M | Valid Frame Ampl. Max | Maximum amplitude of a valid frame in an ampl. seq. |
| N | Oscillation Count Min | Minimum count of oscillations for oscillation test |
| O | Oscillation Count Max | Maximum count of oscillations for oscillation test |
| P | Oscillation Count Amplitude | The inter-frame amplitude difference for an osc. count |

TABLE 3-continued

Test and Threshold Parameters

| | Parameter Name | Description |
|---|---|---|
| Q | Osc Time Range Min | The earliest frame for oscillation test |
| R | Osc Time Range Max | The latest frame for oscillation test |
| S | Osc Frame Error Tolerance | The tolerance for error frames during an osc. test. |
| T | Freq Count Min | Minimum count of frequencies for frequency diversity test |
| U | Freq Count Max | Maximum count of frequencies for frequency diversity test |
| V | Freq Time Range Min | The earliest frame for frequency diversity test |
| W | Freq Time Range Max | The latest frame for frequency diversity test |
| X | Increase Frame Amplitude | The inter-frame amplitude difference for an inc. count |
| Y | Increase Frame Max Error | The tolerance for error frames during an inc. count |
| Z | Increase Frame Count Min | The minimum count of increase frames for the sound |
| AA | Increase Frame Count Max | The maximum count of increase frames for the sound |
| BB | Decrease Frame Amplitude | The inter-frame amplitude difference for a dec. count |
| CC | Decrease Frame Max Error | The tolerance for error frames during a dec. count |
| DD | Decrease Frame Count Min | The minimum count of decrease frames for the sound |
| EE | Decrease Frame Count Max | The maximum count of decrease frames for the sound |
| FF | Error Count Min | Minimum count of error (0) frames for error frame test |
| GG | Error Count Max | Maximum count of error (0) frames for error frame test |

Regarding the number of amplitude sequences: this refers to the number of amplitude sequences into which a sound sample is to be transformed. For example, if n is 1, then the sound sample to be tested is only transformed into 1 amplitude sequence, and this 1 amplitude sequence is a sequence of amplitudes of the most prominent frequency content in frames. If n is two, then the first amplitude sequence is a sequence of amplitudes of the most prominent frequency content in frames, and the second amplitude sequence is a sequence of amplitudes of the $2^{nd}$ most prominent frequency content in frames. Prominence, in this embodiment, refers to amplitude. A given frame corresponding to a particular sound sample may incorporate frequency content that is within different bands. Particularly for short sounds, analyzing using only the most prominent frequency content in a given frame may not provide enough information to distinguish between very similar, very short sounds. However, the processes described herein enabling the transformation of a sound sample into multiple amplitude sequences, each corresponding to an 'order' of prominence, provides for the extraction of additional useful information about a sound. This is because the features and patterns of additional orders, or at least the existence of significant amplitudes in the additional orders, can indicate distinctions between sounds.

Figure 6A:
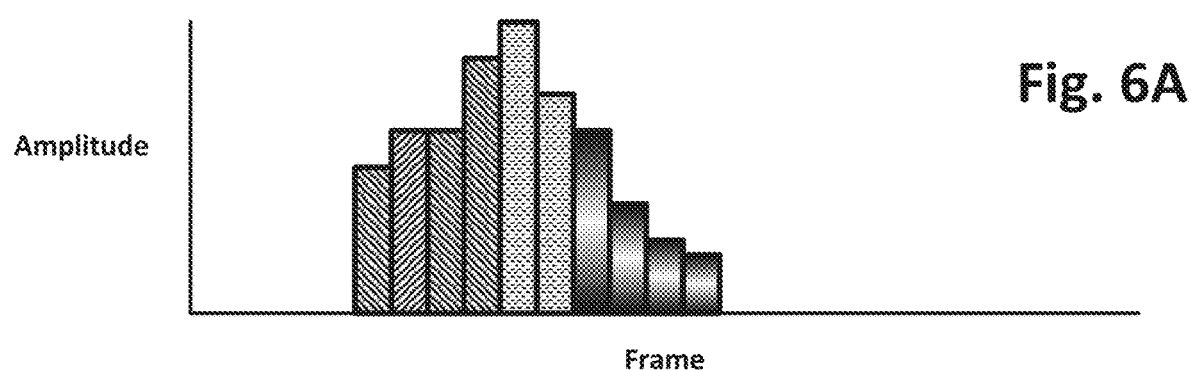
FIGS. 6A, 6B and 6C are first, second and third-order amplitude sequences produced by a transform process of the sound identification system using an input sound sample.
Figure 6B:
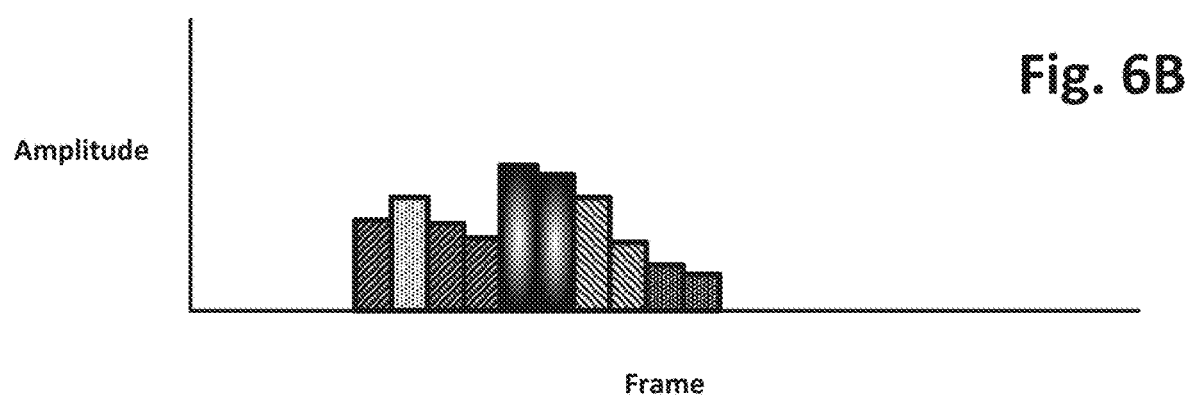
Figure 6C:
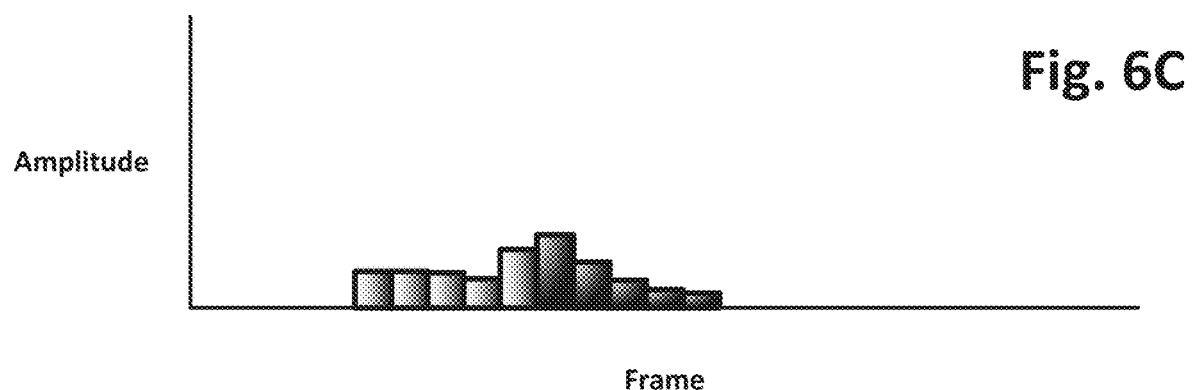
Figure 7A:
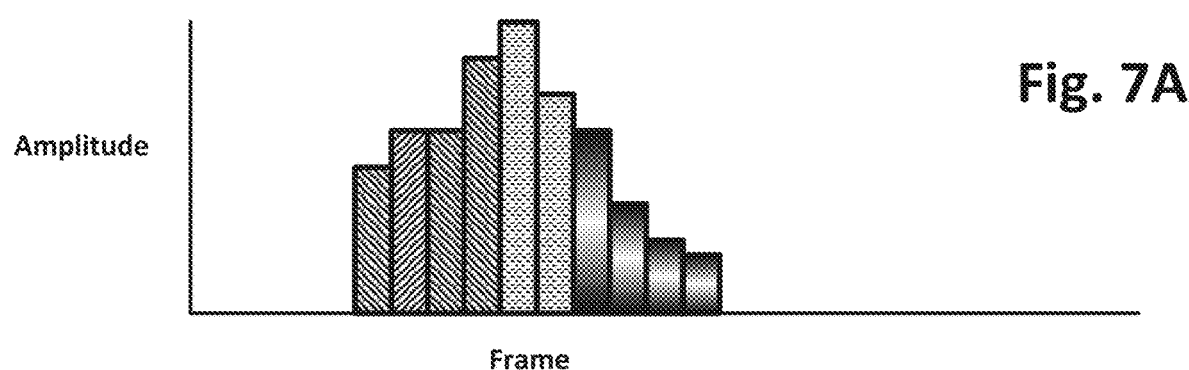
FIGS. 7A, 7B and 7C are first, second and third-order amplitude sequences produced by a transform process of the sound identification system using a different input sound sample.
Figure 7B:
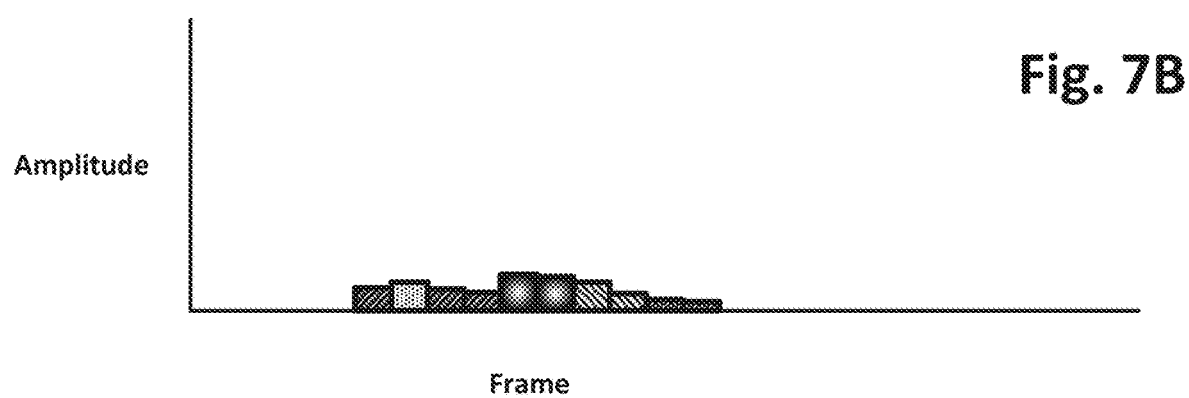
Figure 7C:
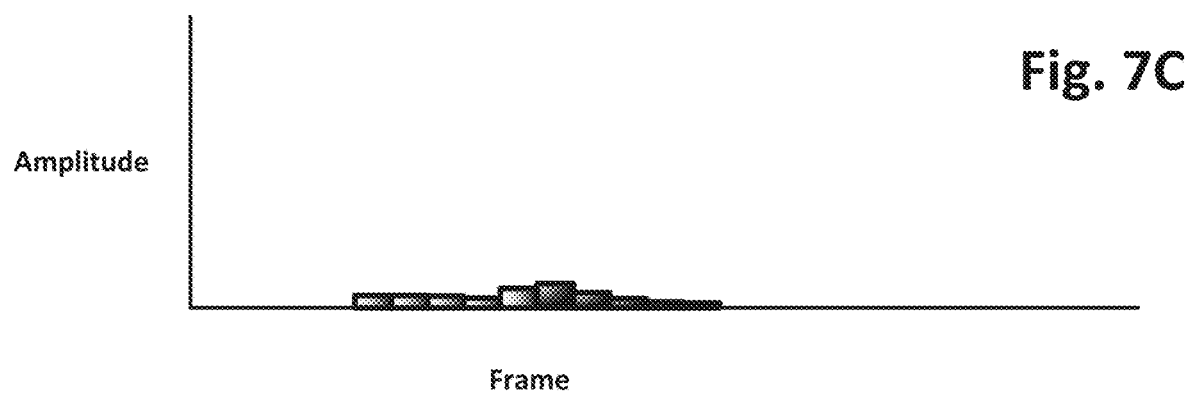

FIG. 6A is a graph of a first order amplitude sequence produced by the transform process 50 using a sound sample. FIG. 6B is a graph of a second order amplitude sequence produced by the transform process using the sound sample, and FIG. 6C is a graph of a third order amplitude sequence produced by the transform process using the sound sample. The different fills of the amplitude bars represent the content of different frequency bands. It can be seen that there is significant "content" in the second and third orders, in addition to the first order content. This can be contrasted with the graphs of FIGS. 7A to 7C. For example, FIG. 7A is a graph of a first order amplitude sequence produced by transform process 50 using the sound sample. The graph of FIG. 7A is very similar to the graph of FIG. 6A. However, the graph of FIG. 7B is quite different from the graph of FIG. 6B. Similarly, the graph of FIG. 7C is quite different from the graph of FIG. 6C. More particularly, there is far less 'content' in the second and third orders of the sound sample presented to the transform process 50 to produce amplitude sequences corresponding to graphs 7B and 7C than there is in the second and third orders of the sound sample presented to the transform process to produce amplitude sequences corresponding to graphs 6B and 6C. Because transform process 50 has been provided with transform parameters for producing more than one amplitude sequence, each representing nth-prominence (i.e. most prominent, second-most prominent, third-most prominent, etc.) frequency content, the test process 50 is able to process the multiple orders thus to generate test results using additional information about the sound sample.

Within database 40, there is also a TestRegime record associated with the soundID for a particular sound. This is also retrieved by configuration process 30, for configuring test process 60 to conduct certain of the base of tests and not others, and for specifying the parameters for the tests to be conducted. In an embodiment, within the TestRegime record are weights indicating how the selected tests for a sound are to be weighted during the execution of testing process 60.

The user inputs the sound sample by speaking into an audio transducer, in this embodiment the default device microphone as will be described in further detail below. The signal flow from the microphone includes passing analog electronic signals captured by the microphone into an audio interface within the computing device that provides pre-amplification and then conversion using an ADC (audio to digital converter) to digital format. ADC conversion is well-understood and involves electronically sampling the analog signals to produce discrete samples. The samples resulting from ADC conversion are buffered in an audio input buffer and combined from the buffer into an audio file that may be processed by a downstream process, played back, etc. In some implementations, the buffered samples are processed for coding/compression (such as for storage in MP3 audio files or other compression formats), and in others the buffered samples are stored generally as uncompressed samples (such as for storage in WAV audio files or other such formats).

The stored (uncompressed) audio file is then passed to frame division process 52, which allocates sequences of the digital samples to respective frames. In this embodiment, the number of frames into which the digital samples are to be allocated is based on the sampling rate and an FFT buffer size. The sampling rate refers to how many samples of the analog microphone signal are to be taken each second, with a common sampling rate being 44100 samples per second (Hz), or 44.1 kHz. The FFT buffer size specifies how many of these samples are to be together processed using the downstream frequency transform 53 thereby to discern the frequency content within a given frame.

With the frame division having been conducted, the frequency transform process 53 processes the digital samples by frame using a Fast Fourier Transform (FFT) in order to register a set of frequencies for each frame. In this embodiment, the number of frequencies to be allocated to each frame is a configurable transform parameter. For some sounds, only one frequency per frame may need to be allocated, and the frequency chosen would be the most prominent frequency (the frequency discerned using the FFT with the highest amplitude in that frame). However, as described herein, many sounds—particularly short ones— can have very similar most-prominent frequency content. As such, the frequency transform process 53 is configurable using transform parameters to allocate multiple frequencies n per frame (depending on the content of the samples of the frame in all cases) thereby to enable downstream processes to operate on nth-prominence frequency content as will be described.

In this embodiment, the frequency transform process 53 employs an FFT class named FourierTransform, requiring that the audio buffers to be analyzed have a length that is a power of two (2). The FFT class is provided with digital sample buffers recorded with a sampling rate of sampleRate and a frame size set at timeSize corresponding to the length of the sampling buffers.

By way of explanation, a Fourier transform is an algorithm that transforms a signal in the time domain, such as a sample buffer buffering a set of samples, into a signal in the frequency domain, often called the spectrum. The spectrum does not represent individual frequencies, but actually represents frequency bands centered on particular frequencies. The centre frequency of each band is usually expressed as a fraction of the sampling rate of the time domain signal and is equal to the index of the frequency band divided by the total number of bands. The total number of frequency bands is usually equal to the length of the time domain signal, but access is only provided to frequency bands with indices less than half the length, because they correspond to frequencies below the Nyquist frequency. That is, given a signal of length N, there will be N/2 frequency bands in the spectrum. As an example, if one constructs a FourierTransform with a timeSize of 1024 and a sampleRate of 44100 Hz, then the spectrum will contain values for frequencies below 22010 Hz, which is the Nyquist frequency (half the sample rate). If one specifies the value of band number 5, this will correspond to a frequency band cantered on 5/1024*44100=0.0048828125*44100=215 Hz. The width of that frequency band is equal to 2/1024, expressed as a fraction of the total bandwidth of the spectrum. The total bandwidth of the spectrum is equal to the Nyquist frequency, which in this case is 22050, so the bandwidth is equal to about 50 Hz. A function getFreq( ) allows one to query the spectrum with a frequency in Hz and the function getBandWidth( ) will return the bandwidth in Hz of each frequency band in the spectrum. A typical usage of a FourierTransform is to analyze a signal so that the frequency spectrum may be represented in some way, typically with vertical lines.

With the frequency transform having been conducted such that there is derived a set of one or more frequencies per frame (each with corresponding amplitudes), the filtering process 54 filters frequencies in each frequency set into a respective one of a plurality of orders based on relative prominence. For example, in a given frame, the most prominent (highest amplitude) frequency will be allocated to the first of the orders, the second-most prominent (second-highest amplitude) frequency will be allocated to the second of the orders, the third-most prominent (third-highest amplitude) frequency will be allocated to the third of the orders, and so forth. In this manner, an nth-order representation of the content of the audio signal will contain the nth-most prominent frequencies across all frames, and their respective amplitudes. The process may filter the frequency content into several orders, potentially thirty (30) order depending on the nature of the audio signal and the information sought from it.

With the filtering process 54 having filtered frequencies into respective orders, such that in each order for each frame there is a maximum of only one frequency represented, the amplitude sequence process 55 generates multiple amplitude sequences based on the orders. In this embodiment, each amplitude sequence n respectively includes a sequence of amplitudes of the nth-order frequency content in the frames. The amplitude sequences 55$a,b,c$ etc. are then provided to an output process that generates user-apprehendable content based on the multiple amplitude sequences for a user interface. In this embodiment, the output process includes the test process 60 producing a sound detection score and the user interface process 20 to generate for the user a representation of the sound detection score, such as a visual display of the sound detection score, an audible sound, or the like.

In an embodiment, additional processing is conducted on the amplitude sequences using image processing algorithms for discerning content. A graphical representation of the audio signal may be produced and provided to a neural network that has been trained using date for images to discern between the graphical depictions of different sounds. One or multiple amplitude sequences, combined or separate from each other, may be used to produce respective graphical plots, including graphical distinctions between frequencies (as shown in tool 3000 below) so that they may be classified using a trained neural network. A graphical depiction of the analog signal, as yet unfiltered into amplitude sequences, may also be produced. Such graphical representations, generally suitable for display to a user using a display device, may not actually be displayed during sound detection but may instead be resolved into pixel-value tables for provision to the neural network. The neural network, appropriately trained, classifies the pixel-value tables, and thus the corresponding graphical depictions, to provide a classification for the sound based on the shape of the amplitude sequences into which it may be resolved, and/or the shape of the graphical depiction of the analog signal. For example, the neural network may classify a sound as a "buh" with a confidence of 75%, and as a "tuh" with a confidence of 25%, based on the shape/contour, size, frequency diversity of one or more of the amplitude sequences into which the audio signal is resolved and provided with graphical attributes that correspond to audio content distinctions and contrasts, as described above. The neural network's classification can then be combined with an identification conducted using the different mode to sound testing described herein, in order to modify the sound identification score. For example, if the sound identification score determined using the techniques described below is determined to have 50% confidence that the sound is a "buh", while the classification using the graphical information of the sound as a "buh" has a 75% confidence, then on balance the highest confidence from the two modes of sound identification goes to the sound being a "buh". This multi-modal technique for sound identification is akin to a person employing both their senses of sight and sound to cognitively apprehend an object, rather than using only one of their senses, so that each of the senses can work together to arrive at a higher confidence about the nature of the object than they could were they deployed in isolation.

Figure 8:
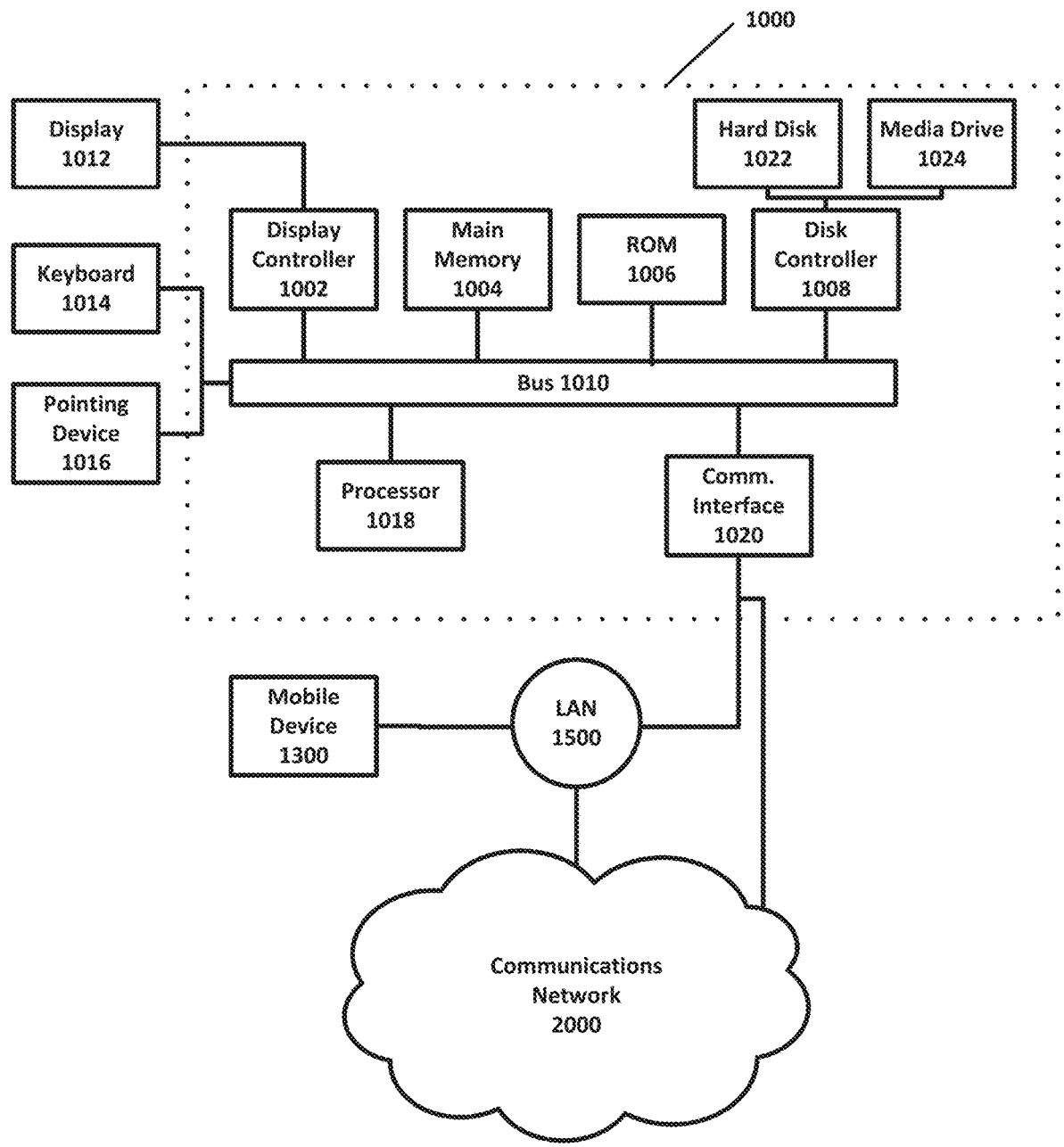
FIG. 8 is a schematic diagram showing a hardware architecture of a computing system, according to an embodiment.

FIG. 8 is a schematic diagram showing a hardware architecture of a computing system 1000, according to an embodiment. Computing system 1000 is suitable as the hardware platform for sound identification system 10. In this embodiment, computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

Computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

Computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Computing system 1000 also includes a display controller 1002 coupled to the bus 1010 to control a display 1012, such as an LED (light emitting diode) screen, organic LED (OLED) screen, liquid crystal display (LCD) screen or some other device suitable for displaying information to a computer user. In embodiments, display controller 1002 incorporates a dedicated graphics processing unit (GPU) for processing mainly graphics-intensive or being used for other highly-parallel operations. Such operations may include conducting image processing using amplitude sequences into which a sound sample has been transformed, or conducting classification based on an additional machine-learning statistical model. Use of a GPU relieves processor 1018 of having to undertake such intensive operations at the expense of overall performance of computing system 1000. Typically, the GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application programming interface (API) such as OpenGL, Direct3D and the like.

Computing system 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. The computing system 1000 employs a display device that is coupled with an input device, such as a touch screen. In this embodiment, input devices include a microphone audio transducer for producing electronic signals for use by computing system 1000 based on audio signals interacting with the microphone diaphragm. Other input devices may be employed, such as those that provide data to the computing system via wires or wirelessly, such as gesture detectors including infrared detectors, gyroscopes, accelerometers, radar/sonar and the like. A printer may provide printed listings of data stored and/or generated by the computing system 1000.

Computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry may be used in place of or in combination with software instructions.

As stated above, computing system 1000 includes at least one processor readable medium or memory for holding instructions programmed according to the teachings of the invention and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, is software for controlling the computing system 1000, for driving a device or devices to perform the functions discussed herein, and for enabling computing system 1000 to interact with a human user (e.g., for controlling mixing of live-streams of audio and video and other media). Such software may include, but is not limited to, device drivers, operating systems, development tools, and applications software. Such processor readable media further includes the computer program product for performing all or a portion (if processing is distributed) of the processing performed discussed herein.

The computer code devices discussed herein may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a wired or wireless connection using a modem. A modem local to the computing system 1000 may receive the data via wired Ethernet or wirelessly via Wi-Fi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

Computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Computing system 1000 may be provisioned with or be in communication with live broadcast/streaming equipment that receives and transmits, in near real-time, a stream of digital video/audio content captured in near real-time from a particular live event, performer or participant.

While the principles described herein are applicable to sound detection through transformation of an audio signal into multiple amplitude sequences based on relative prominence of the frequency content, such transformations can be useful for providing characterizations of audio signals for other purposes. Such other purposes may include enabling a user or a system to distinguish audio signal content that is not related to meaning of information intended to be conveyed by a speaker, from audio signal content that is in fact related to the meaning of information to be conveyed. Such distinctions, made automatically or made visually discernible by a user using the principles described herein, can enable such differential content to be differentially deployed, filtered-out, studied for patterns or character, or otherwise processed in a useful way based on the application required. Such distinguishing and subsequent processing, including processes involved in transducing an audio signal and processing the audio signal using an audio interface, transforming and otherwise processing the audio signals and outputting user interface content based on multiple amplitude sequences for various purposes, may be conducted using one or more computing systems such as computing system 1000 described above, specifically configured using processor-readable code and coupled to appropriate transducers, audio interfaces, network interfaces, storage devices and the like for a particular application.

Figure 9:
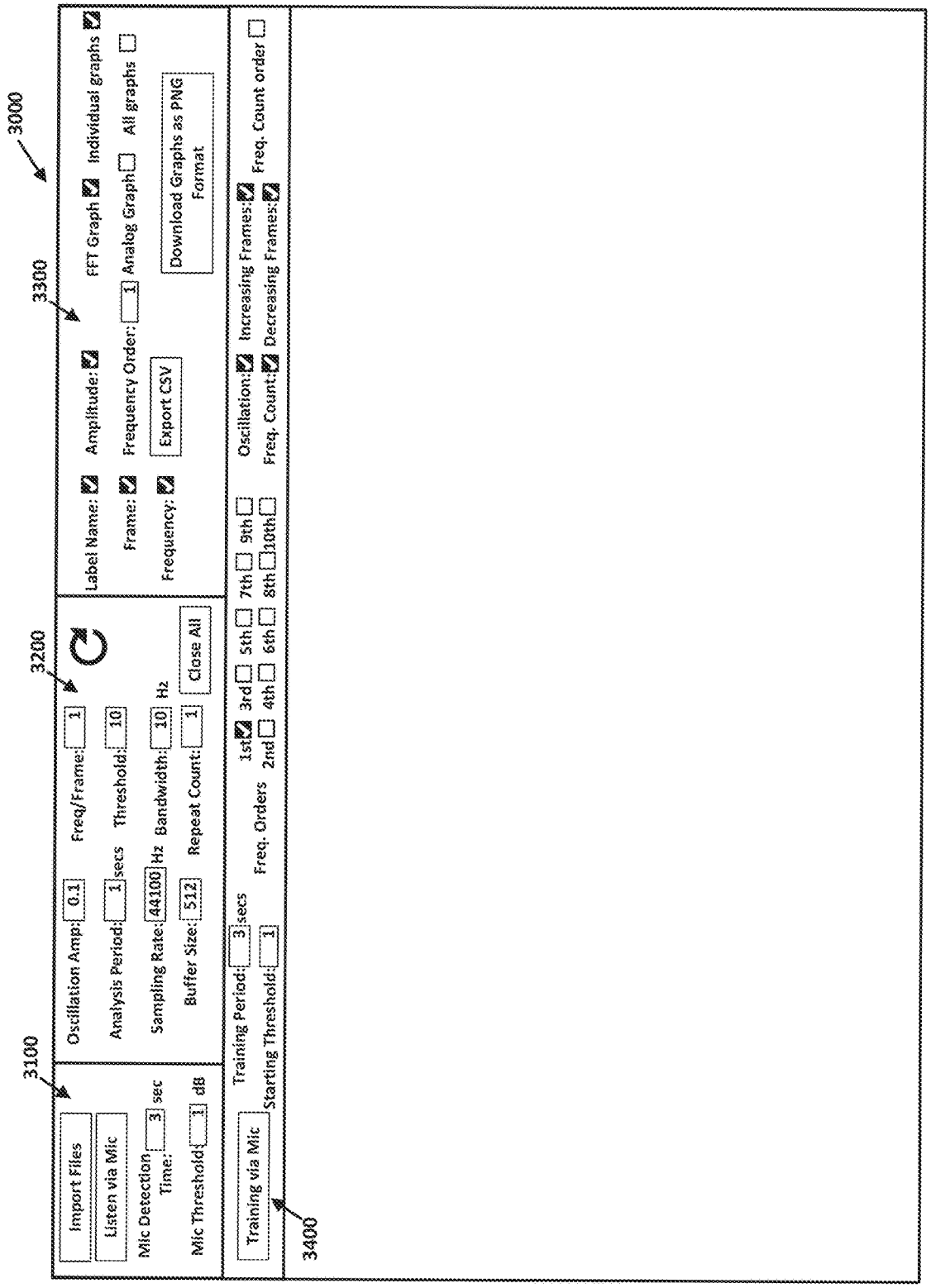
FIG. 9 is a screenshot of an initial screen of a computer-based tool providing various parameters for enabling an engineer or researcher to either select or record an audio file and to very flexibly explore the nature of the sound in the audio file, according to an embodiment.

FIG. 9 is a screenshot of an initial screen of a computer-based tool 3000 providing various parameters for enabling an engineer or researcher to either select or record a sound file and to very flexibly explore the nature of the sound in the sound file, according to an embodiment. Because tool 3000 provides a visual display of one or multiple amplitude sequences generated using processes 52 through 55 described above, it is useful at least for enabling a researcher to establish soundProfile parameters that can be deployed downstream by a sound identification system 10 such as that described above.

The initial state of tool 3000 when initialized provides an input section 3100, a parameter exploration section 3200, an output section 3300, and a training section 3400.

Input section 3100 provides an Import Files button that can be selected by a user to provide a file selection window enabling the user to select a sound file from a directory for input into tool 3000. It will be understood that a given sound file will have been already produced using a sampling rate, and thus is not re-sampled during processing by tool 3000. Input section 3100 also includes a Listen Via Mic button that can be selected by a user to trigger a microphone of a tool 3000 to begin recording a sound in real time (including sampling) into a sound file for analysis. Input parameters for this mode of operation include a Mic Detection Time text box, in FIG. 8 indicating a three (3) second detection time, and a Mic threshold text box, in FIG. 9 indicating a one (1) decibel (dB) intensity threshold. In this example, after pressing the Listen via Mic button, tool 3000 will trigger the recording of sound received via microphone into a sound file, immediately after first receiving sound having an intensity of at least 1 dB for a maximum of 3 seconds. A user of tool 3000 may increase or reduce the Mic Detection Time and the Mic Threshold by entering different numbers into respective text boxes.

Parameter exploration section 3200 provides a user with a number of parameters for exploring a sound that has been inputted into tool 3000 via use of input section 3100. Shown in this embodiment is a control for adjusting an oscillation amplitude, which sets a threshold amplitude difference between successive amplitudes in frames that tool 3000 will count as an oscillation. In this example, a difference between amplitudes in adjacent frames of 0.1 will count as an oscillation. It will be understood therefore that the term oscillation, in this embodiment, is meant as a threshold amplitude difference between frames. Also shown is an analysis period control, in this example set at one (1) second. The analysis period control is for enabling a user of tool 3000 to focus analysis on a particular subsection of the sound file under analysis. For example, a particular sound file may capture 3 seconds of sound, including empty space before and after the core of the sound. The analysis period control enables a user to hone in one just the portion of the sound file carrying the core of the sound.

A sampling rate control, in this example set at 44100 Hertz (Hz), establishes the rate at which the sound file is to be sampled for analysis. The sampling rate control and an FFT size control, in this example set at 512 samples, work in tandem to establish a "resolution" at which frames of sound are established. In particular, a larger buffer size will provide for longer individual frames, which results in lower frequency resolution for each of the frames. By providing a smaller buffer size, individual frames represent a smaller slice of the sound and can thereby be more granular as to the frequency and corresponding amplitude content within the slice. The sampling rate and FFT buffer size controls enable the user of tool 3000 to hone in on an appropriate combination that provides sufficient resolution for creating an accurate and useful soundProfile usable by a downstream sound identification system 10.

A frequency-per-frame (Freq/Frame) control, in this example set at one (1), establishes the number of amplitude sequences to be generated by tool 3000 for a given sound file. In this example, the Freq/Frame control being set at 1 causes tool 3000 to generate a sequence of amplitudes of only the most prominent frequency content in frames of the sound file. If, as will be described below, a user of tool 3000 is interested in exploring beyond the "first order" frequency content, to second-order, third-order, fourth-order frequency content, for examples, the user can enter a correspondingly higher number n into the Freq/Frame text box. In turn, upon pressing a refresh icon, depicted in parameter exploration section 3200 as a circled-arrow, tool 3000 processes the sound file to extract n amplitude sequences each representing the nth-most prominent frequency content in frames of the sound. It has been discovered that having the ability to look "behind" the first order to observe behaviours of amplitude sequences in higher-order amplitude sequences, can enable a user of tool 3000 to segregate a sound into orders so the user can locate and characterize a "core" of a sound so it may be segregated for analysis from other non-core portions of the sound. This is very useful particularly for deeply analyzing short sounds, because even with the dearth of content (relative to much longer sounds) it enables the user to both discover and filter-out noise, non-core portions of the short sounds, and/or portions of the short sounds that are more personal to the speaker of the sound, than they are fundamental to the nature of the utterance. For example, for a given sound, such as a short spoken "b", the lips, breath, sex, age, health and so forth of a particular speaker may cause his or her first order amplitude sequence, with the most prominent frequency content being the result of unindicative airflows against a microphone, to be quite different from the first order amplitude sequence of another speaker, even when both are uttering their respective versions of a "buh". Without the insights provided by segregation into multiple different orders, a user might conclude that not enough information is available to create a signature for the sound content itself since it would not be apparent what could be considered similar between two different speakers' utterances of the same sound. However, the second and/or higher order amplitude sequences segmented using tool 3000 may, even when derived from utterances from two different people, be much more similar, and much more indicative of the "b" content itself, and therefore much more widely applicable for establishing parameters for a soundProfile that can be deployed for use by various users in a sound identification system 10.

A threshold parameter control, in this example set at ten (10), enables a user of tool 3000 to establish the threshold different in amplitudes between successive amplitudes in the amplitude sequence(s) generated by tool 3000 will increment an amplitude difference counter.

A bandwidth parameter control, in this example set at 10 Hz, enables a user of tool 3000 to establish a size of frequency bands and therefore the granularity of frequency distinctions. With the bandwidth parameter control set at 10 Hz, any detected frequencies within 10 Hz of an edge frequency will be depicted in tool 3000 as being within the same band as the edge frequency. For example, of tool 3000 detects frequency content of 86 Hz, 89 Hz and 94 Hz, with the bandwidth parameter control set at 10 Hz, tool 3000 will represent the three different frequency contents as being only 86 Hz. As such, this control enables a user of tool 3000 to filter out relatively unimportant frequency distinctions so key components of the sound being analyzed can become more evident, and so that a downstream sound identification system 10 can, once user of tool 3000 has established a corresponding soundProfile, be relieved of having to keep track of relatively unimportant frequency distinctions.

The repeat count parameter control, in this example set at 1, enables a user of tool 3000 to specify how much a counter will increase in the event that a threshold number of valid frames, frequency and amplitude oscillation, and frequency count, reach a predetermined threshold.

When any of parameter controls in parameter exploration section 3200 is changed or adjusted, the user can press the refresh icon thereby to cause tool 3000 to process the selected sound file in accordance with the changed parameters. If the user wishes to reset the tool 3000, purging the sound file previously selected or recorded, the user can press the Close All button.

Output section 3300 provides various checkboxes and buttons for establishing outputs based on parameter exploration conducted on a particular sound file as will be described herein. Two primary outputs are available: a CSV (Comma-Separated Values) file and an image file, in this embodiment a PNG (Portable Network Graphic) formatted image file or files. For a CSV file, checkboxes for inclusion or withholding of a Label Name, Frame Number, Frequency Values, and Amplitude Values in the resulting CSV file, as well as the number of (available) Frequency Orders for which data should be included in the resulting CSV file, are provided. For the image file, a user can choose whether to export an FFT Graph, and/or an Analog graph, an image file per Individual Graph or one image file with All Graphs. The user is provided, upon pressing the Export CSV button or the Download Graphs as PNG Format button, with the opportunity to select a local or network storage location at which to store the generated export files.

Training section 3400 provides a toggle button that toggles between values Training Via Mic (shown in FIG. 9), and Stop (not shown). Training section 3400 provides a useful tool to a sound analyst for having the microphone continuously listen for inputs and to allocate each discrete input to respective amplitude sequences for display and visual manipulation. In particular, while tool 3000 is in the Training Via Mic "mode", a user can utter sounds multiple times over a Training Period, and each utterance during the training period is allocated to its own amplitude sequence or its own set of amplitude sequences. The Starting Threshold textbox enables the user to specify how loud an utterance must be to be registered, and the Training Period text box indicates how long the microphone should be listening for utterances. With each utterance allocated to its own graph—such as if the user uttered "buh" four or five times during the Training Period—the user could study each of the resultant four or five sets of (one or more) amplitudes sequences for similarities and variances in the "buh's" that were spoken into the microphone. In this way, a user is provided with a visual display of several attempts to utter the same sound, so that using the various parameters of the tool, differences between the several attempts can be ignored or minimized, while similarities can be focused on or maximized, thereby to enable the user to characterize the content with the help of visual feedback.

Furthermore, tool 3000 is able to automatically "abstract out" similarities across the amplitude sequences, for example by measuring the minimum and maximum frequencies in each of the parts of the sound (such as the first part, a middle part, a last part, etc., generally delineated as increasing amplitude section, steady state section, and decreasing amplitude section, respectively), the minimum and maximum number of frames in each of the parts of the sound, and so forth. Thus, provided that a user during a Training Period attempts to speak the same sound multiple times, the abstracting-out of the core of the sound based on similarities between the respective sets of amplitude sequences can be effective for narrowing down on the key aspects of the sound that transcend all or most utterances of it. This kind of analysis may be done in a guided way using the tool, such that the user analyzing the sound can be guided by tool 3000 to identify which frequency orders are more or less important to the core or meaning of the sound, and which are more or less important to the sound generating apparatus (the speaker's lips, sex etc.), which frequencies are most prevalent (occur most) and/or have the highest prominence (are loudest), whether a sound sample is an insufficiently rich sample to use for training, and so forth.

Training section 3400 further provides checkboxes for showing or hiding, across all amplitude sequence sets, the individual Frequency Orders in respective graphs so the user can hone in on all or individual, or individual combinations of orders of the amplitude sequences into which content had been filtered during the Training Period. Checkboxes for showing or hiding Oscillation counts (number of oscillations detected), Frequency counts (number of frequencies detected), Increasing Frames counts and Decreasing Frames counts are also made available. Also, a Frequency Count order checkbox is made available for enabling a user to choose to select whether, during a training period, the frequency count is displayed. Generally speaking, using these checkboxes, a user can choose to select or deselect which analytical information is being displayed so as to tailor the display to the analysis being done so that unnecessary information is not crowding the user's display.

Figure 10:
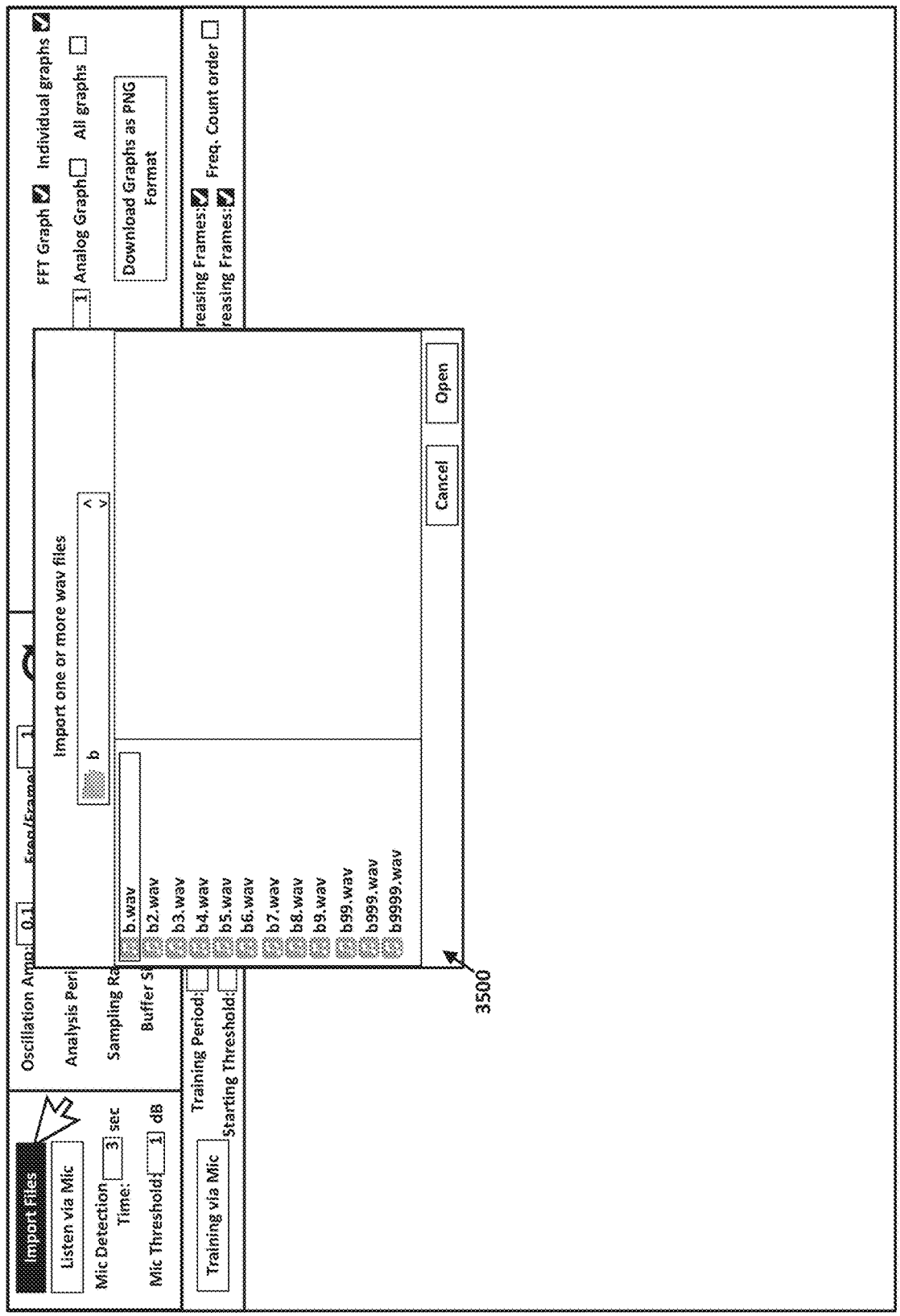
FIG. 10 is a screenshot of an audio file selection pop-up overlying the initial screen of FIG. 9.

FIG. 10 is a screenshot of an audio file selection pop-up window 3500 overlying the initial screen of FIG. 9 pursuant to selection of the Import Files button. In this example, a folder named "b" contains a list of audio files containing multiple examples of the utterance "buh". Any of these audio files can be selected using tool 3000 in order to cause tool 3000 to conduct processing on it. In this embodiment, the "b.wav" file is being selected.

Figure 11:
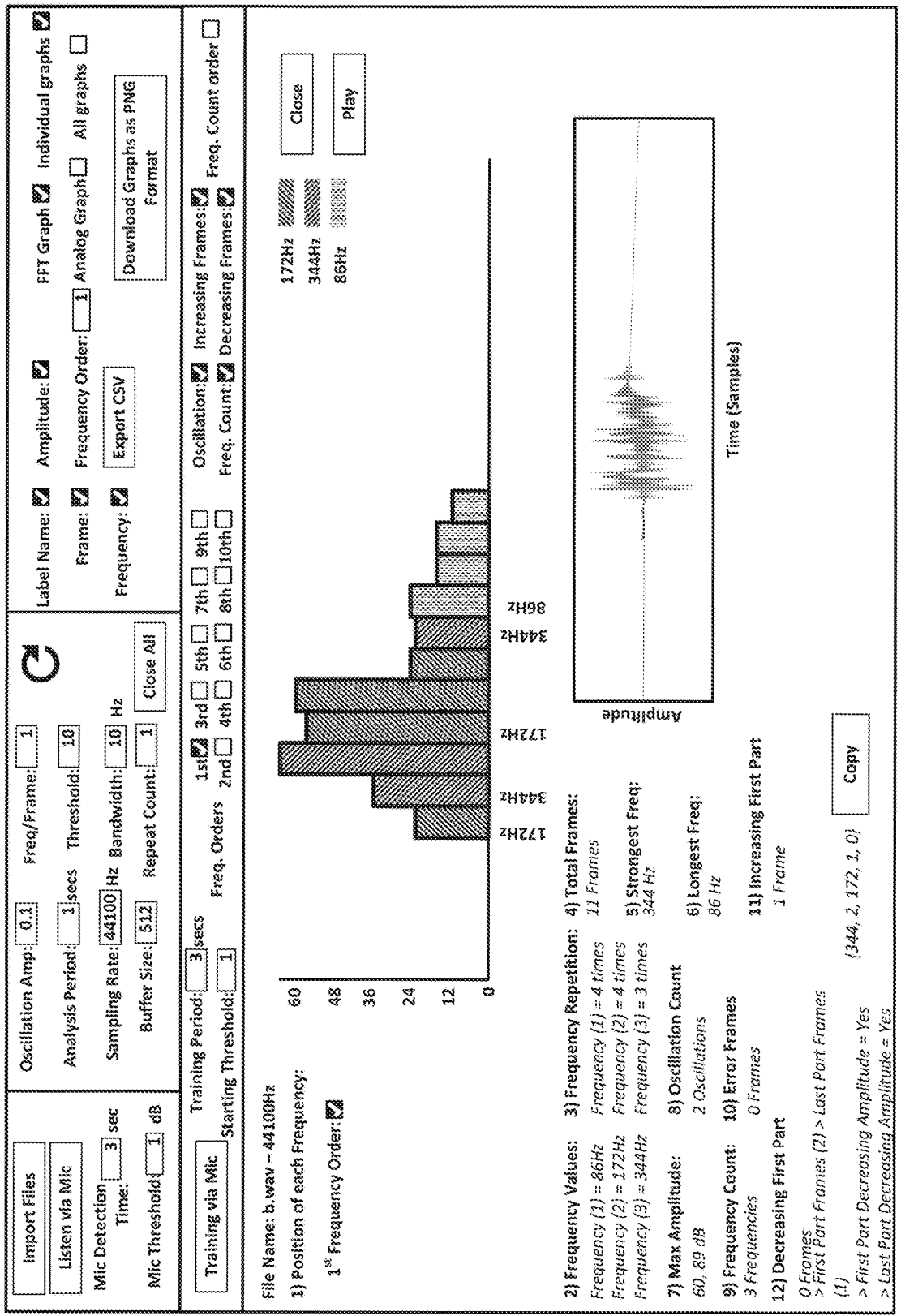
FIG. 11 is a screenshot of a screen of the computer-based tool of FIG. 9 with an audio file having been selected, and a transform process having been automatically executed to generate and display an amplitude sequence and corresponding measurements based on the contents of the audio file.

FIG. 11 is a screenshot of a screen of the computer-based tool of FIG. 9 with an audio file having been selected, and a transform process having been automatically executed to generate and display an amplitude sequence in graph form, and corresponding measurements based on the contents of the audio file. In this example, the selected file is "b.wav" which is a file of audio samples taken at a rate of 44100 Hz. Also in this example, the graph is shown depicting an amplitude sequence corresponding to amplitudes of the most prominent frequencies (the $1^{st}$ Frequency Order, selected using a checkbox for 1) Position of each Frequency) in each of a number of time frames (or, "frames"). The process for generating the data for producing the graph is the same as that described above in connection with the sound identification system 10.

In this embodiment, the different frequencies allocated to respective orders in respective frames are made visually distinct from one another, to enable the user of tool 3000 to apprehend the sound visually. For example, as shown in FIG. 11, the bars representing the amplitudes of the frequencies are respectively patterned according to the frequency. A legend showing three different frequencies in this frequency order and their corresponding pattern in the bar chart appears towards the right hand side of the graph. While in this embodiment for ease of understanding the patterns differ across frequencies, colour instead of or in addition to pattern could be used to help the user visually discern the distinct frequencies in one or more amplitude sequences being displayed. The actual frequency values are shown along the horizontal axis for ease of understanding and reference by the user.

A user is able to adjust the parameters in the parameters section 3200 in order to adjust the look of the graph thereby to work towards understanding the sound. For example, the user may adjust the Bandwidth parameter in order to provide wider or narrower bandwidths into which the frequency content is to be grouped, and this will affect somewhat which frequencies are displayed in the graph. It will be noted that, for frequency 172 Hz, for example, the content being represented is not only amplitudes of the 172 Hz content in the given frame, but also the amplitude of frequency content that is within the same 10 Hz band as the 172 Hz content.

This may actually include frequency content between 170 Hz and 180 Hz. As such, if the bandwidth is changed to 5 Hz, the frequency content that was originally combined together in the 172 Hz band due to the 10 Hz bandwidth may be split across two different bands (say, between a 170-174 Hz band and a 175-179 Hz band), leading to a different display of content, depending on the actual content of the audio file.

Below the graph are items of information pertaining to the analysis, including a 2) Frequency Values subsection which summarize the multiple frequencies appearing in the currently-displayed amplitude sequence(s). In this example, the three (3) frequency values are shown listed. Similarly, a 3) Frequency Repetition subsection displays the number of times each frequency that is identified and being displayed as part of one or more amplitude sequences is itself repeated in the amplitude sequences. In this example, Frequency(1), corresponding to 86 Hz, is repeated four (4) times. That is, in the amplitude sequence displayed, 86 Hz is the nth-most prominent frequency in four (4) of the frames. Similarly, Frequency(2), corresponding to 172 Hz, is repeated four (4) times, corresponding to 172 Hz being the nth-most prominent frequency in four (4) of the frames. And, Frequency(3), corresponding to 344 Hz, is repeated three (3) times, corresponding to 344 Hz being the nth-most prominent frequency in three (3) of the frames.

Also shown is the 4) Total Frames, in this embodiment 11 frames, indicating the total number of frames detected according to the parameters set out in the parameter section 3200, the 5) Strongest Frequency, in this embodiment 344 Hz, indicating the frequency producing the highest bar in the amplitude sequence.

Also shown is 6) Longest Freq, in this embodiment 86 Hz, which displays the frequency that appears the most within the frequency orders being displayed. In this example, one frequency order is being displayed (the 1$^{st}$ frequency order) and, within this order, the 86 Hz band takes up four (4) frames. In the event that multiple orders are being displayed, then 6) Longest Freq will display the frequency responsible for the most number of frames across all displayed orders. As such, a particular frequency may be responsible for two frames in the first order and four frames across higher orders, for a total of six frames. If no other frequency was responsible for six frames or more across all orders being displayed, then that frequency is considered the longest frequency.

7) Max Amplitude displays the highest amplitude in units of decibels (dB), in this example 89 dB corresponding to the third displayed frame for which 344 Hz content was responsible.

8) Oscillation Count displays the rate that the amplitude changes a threshold amount between frames across the set of frames on display. The threshold amount is set by the Threshold dB value set in region 3200. In this example, the rate is measured at two (2) frames, which means that on average the amplitude changes by at least 10 dB every two (2) frames. This might be arrived at by considering, in a sequence of 5 frames, that an amplitude may change 10 dB across the first two adjacent frames, but may change 10 dB across the sequence of the next three (3) frames (because the inter-frame difference between any two adjacent frames in the set of the next three frames does not reach 10 dB), such that the average of these would be two (2). As such, the Oscillation Count indicates how many frames, on average, it takes for there to be a threshold change in amplitude. A portion of the amplitude sequence that requires passage of a high number of frames before a threshold change in amplitude, will increase the Oscillation count, whereas a portion of the amplitude sequence that requires passage of only a small number of frames before a threshold change in amplitude, will lower the Oscillation Count.

Similarly, a Frequency Oscillation Count (not displayed) is the rate that the frequency changes a threshold amount between frames across the set of frames on display. The threshold amount is set by the Bandwidth value set in region 3200. As such, the Frequency Oscillation Count indicates how many frames, on average, it takes for there to be a threshold change in frequency. A portion of the amplitude sequence that requires passage of a high number of frames before a threshold change in frequency, will increase the Frequency Oscillation Count, whereas a portion of the amplitude sequence that requires passage of only a small number of frames before a threshold change in frequency, will lower the Frequency Oscillation Count.

9) Frequency Count is a number of the frequencies being displayed, and corresponds to the number of frequencies represented in the legend corresponding to the displayed amplitude sequence.

10) Error Frames is a number of frames that appear between valid frames in the amplitude sequence. A valid frame is a frame with frequency content that is within a defined frequency range and has an amplitude within a defined amplitude range. An invalid frame is a frame that has frequency content only outside of the defined frequency range and/or frequency content that is outside of a defined amplitude range. Once valid frames are identified in the amplitude sequence, any invalid frames appearing between two or more valid frames are considered error frames. In this example, there are zero (0) Error Frames.

11) Increasing First Part is a count of the number of increasing frames in the first part of the amplitude sequence, and 12) Decreasing First Part is a count of the number of decreasing frames in the first part of the amplitude sequence. A first part of an amplitude sequence is generally the portion at the beginning of the amplitude sequence until the amplitude reaches generally a steady value, at which point the amplitude sequence enters its middle part. When the amplitude begins falling marks the start of the end part of the amplitude sequence. An increasing frame is a frame that is a threshold amplitude higher than its previous frame. A decreasing frame is a frame that is a threshold amplitude lower than its previous frame. In this example, the Increasing First Part is one (1) frame and the Decreasing First Part is zero (0) frames.

Figure 12:
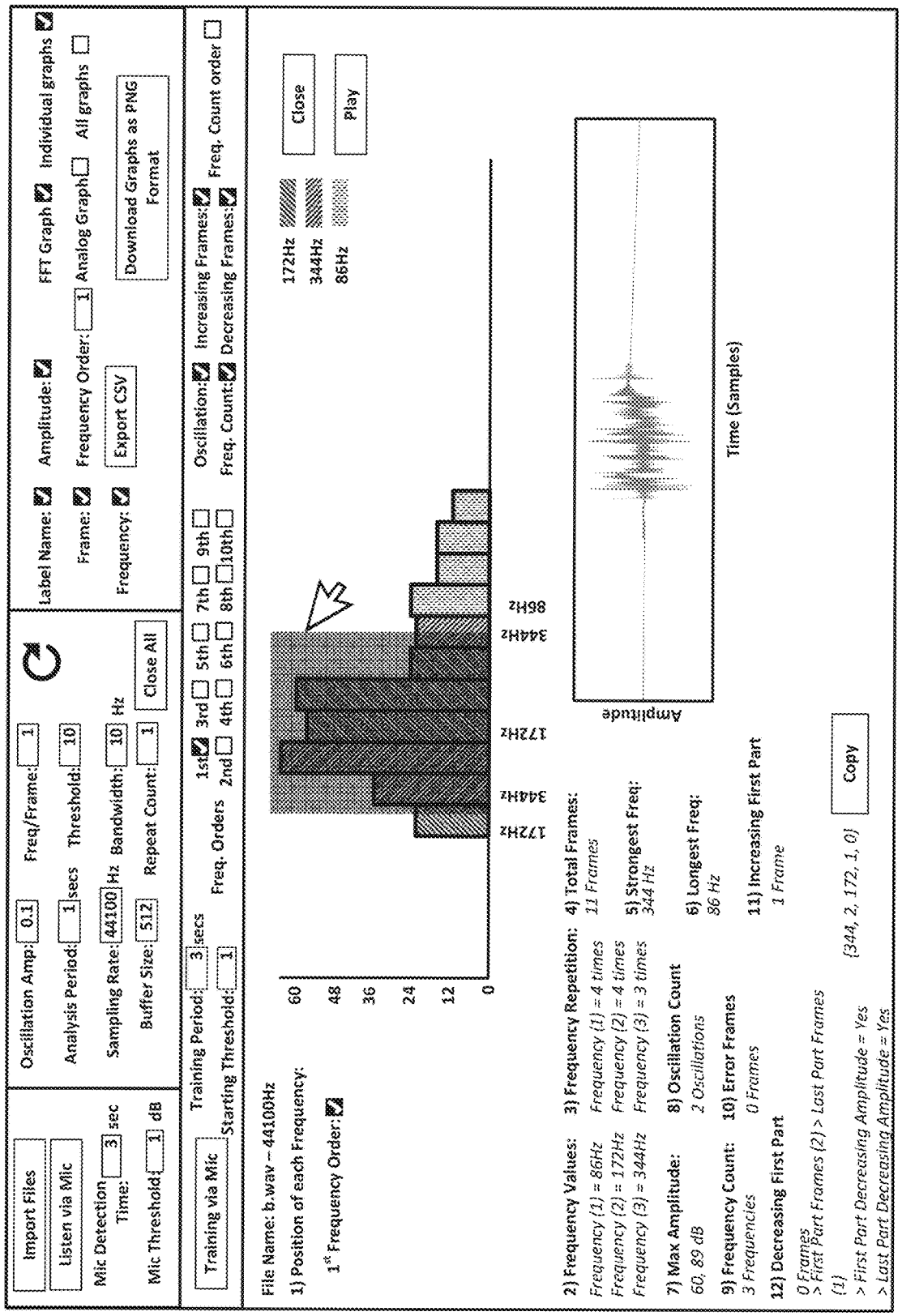
FIG. 12 is a screenshot of the screen of FIG. 11 while a portion of an amplitude sequence being displayed is being selected for study.
Figure 13:
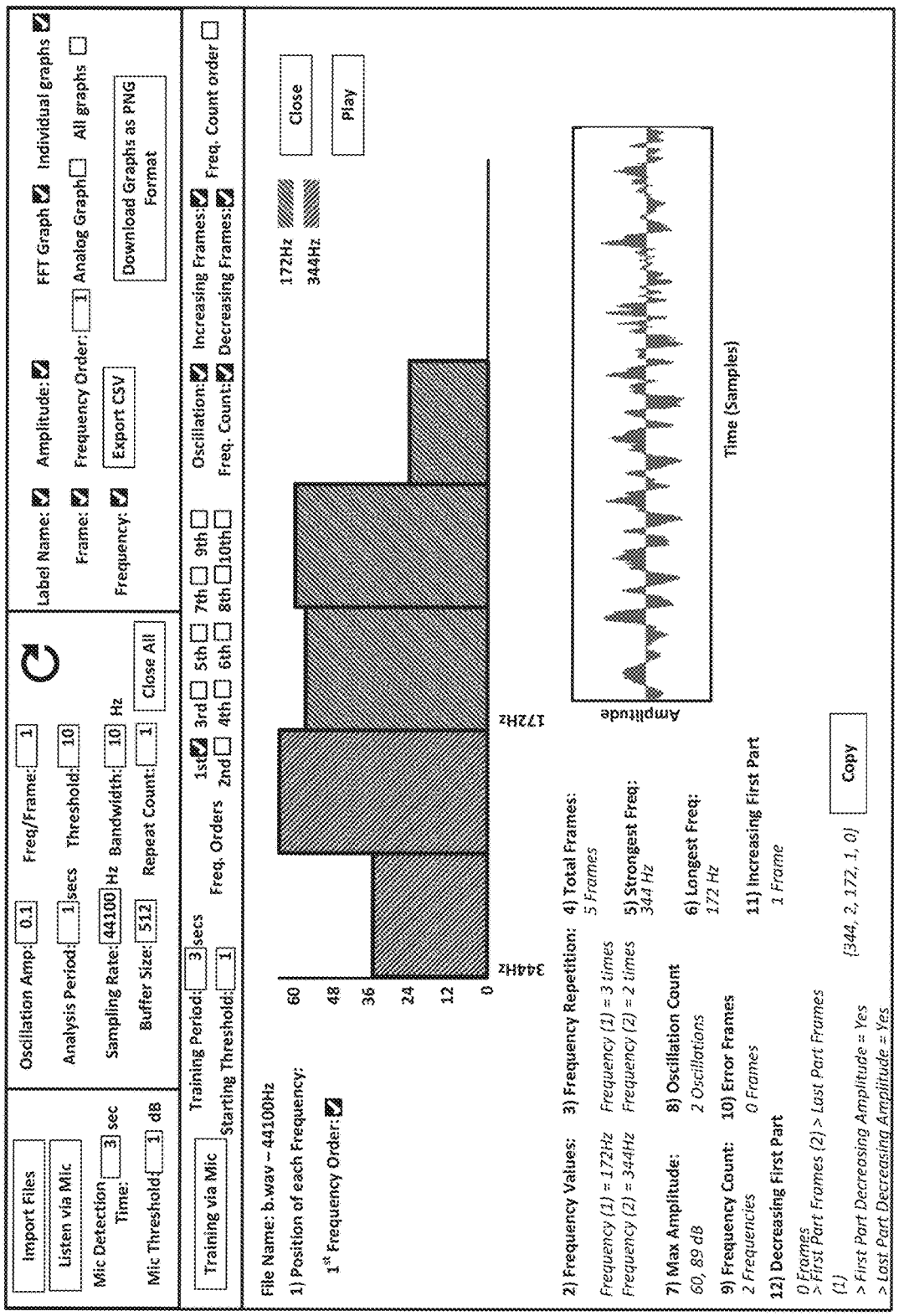
FIG. 13 is a screenshot of the screen of FIG. 11 while the portion of the amplitude sequence selected in FIG. 12 is being maximally displayed.

FIG. 12 is a screenshot of the screen of FIG. 11 while a portion of an amplitude sequence being displayed is being selected for study. A user is able to select a portion of the amplitude sequence by dragging a mouse pointer across the region of interest thereby to highlight the region of interest, and releasing the mouse button. FIG. 13 is a screenshot of the screen of FIG. 11 resulting from the release of the mouse button, showing while the portion of the amplitude sequence selected in FIG. 12 being maximally displayed. The display of the time/amplitude plot of the audio file is modified to correspond to the portion of the amplitude sequence being shown. Clicking the mouse button while the mouse is positioned in the plot reverts the amplitude sequence to its default display configuration, as shown in FIG. 12.

Figure 14:
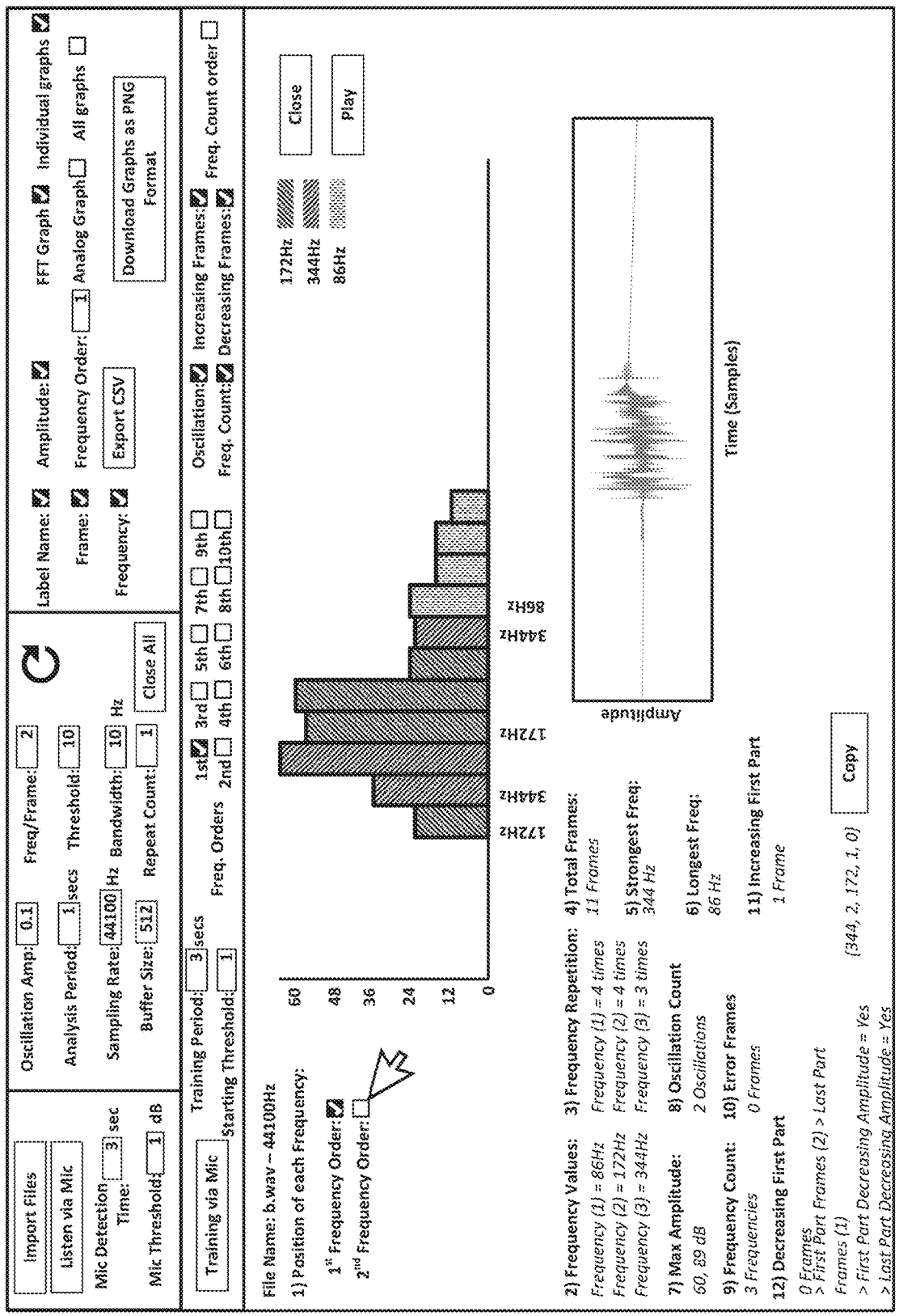
FIG. 14 is a screenshot of the screen of FIG. 11 with a transform process having been automatically executed to generate multiple amplitude sequences and display one of the multiple generated amplitude sequences and corresponding measurements based on the content of a selected audio file.
Figure 15:
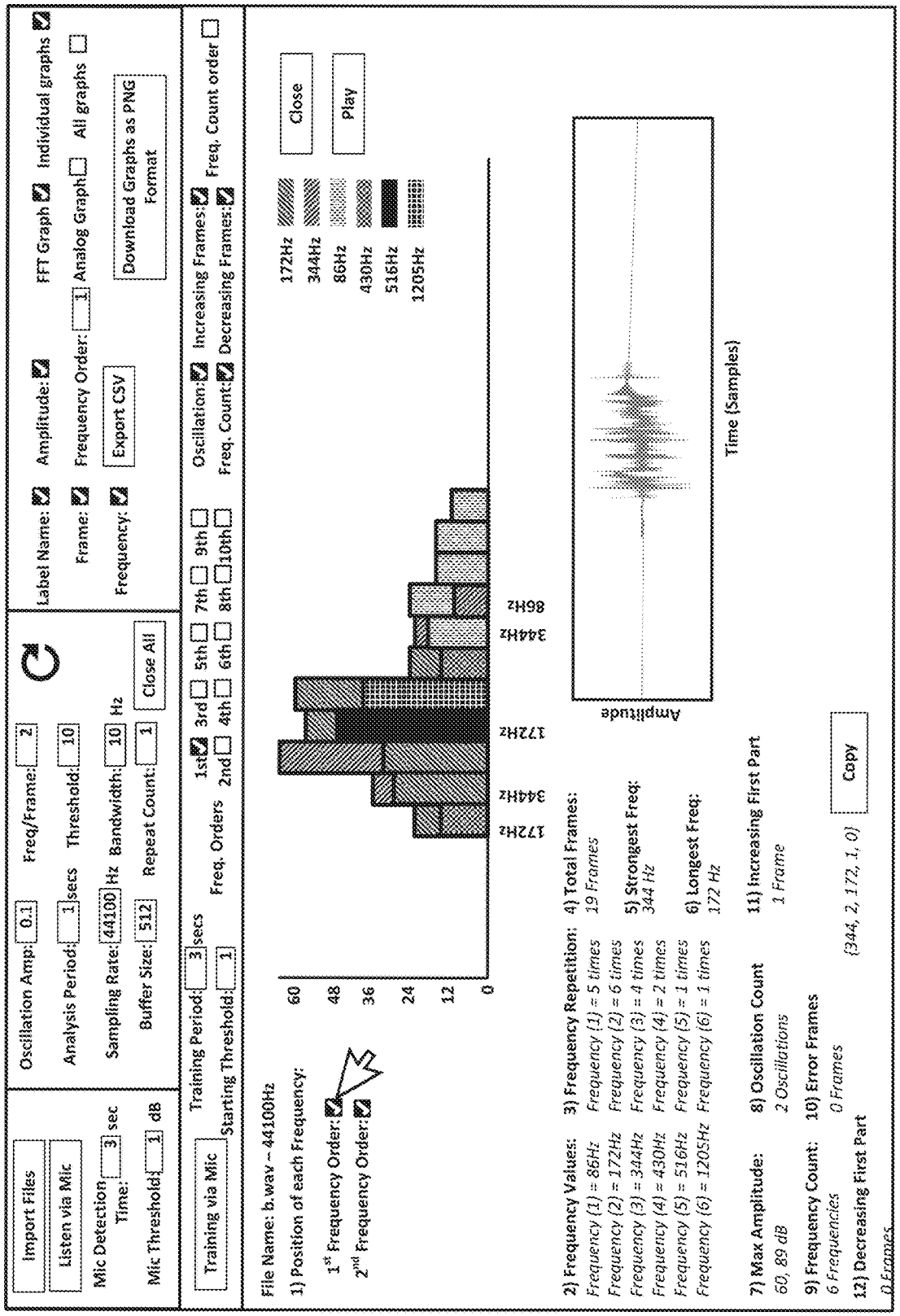
FIG. 15 is a screenshot of the screen of FIG. 14 with a user having selected to display multiple of the generated amplitude sequences overlying each other, and corresponding measurements.

FIG. 14 is a screenshot of the screen of FIG. 11 with a transform process having been automatically executed to generate multiple amplitude sequences and to display one of the multiple generated amplitude sequences and corresponding measurements based on the content of a selected audio file. A mouse pointer is poised beside a checkbox for toggling display of a $2^{nd}$ frequency order in the plot. FIG. 15 is a screenshot of the screen of FIG. 14 with a user having selected to display multiple of the generated amplitude sequences overlying each other, and corresponding measurements. It can be seen that the corresponding measurements represent a compilation, or summing, of the measurements for both of the $1^{st}$ and $2^{nd}$ frequency orders for which amplitude sequences are being displayed, overlaid on to each other, in the plot. A total count and identification of frequencies are shown as visually distinct from each other, and the measurements including 6) Longest Frequency take into account the content of the two selected frequency orders.

Figure 16:
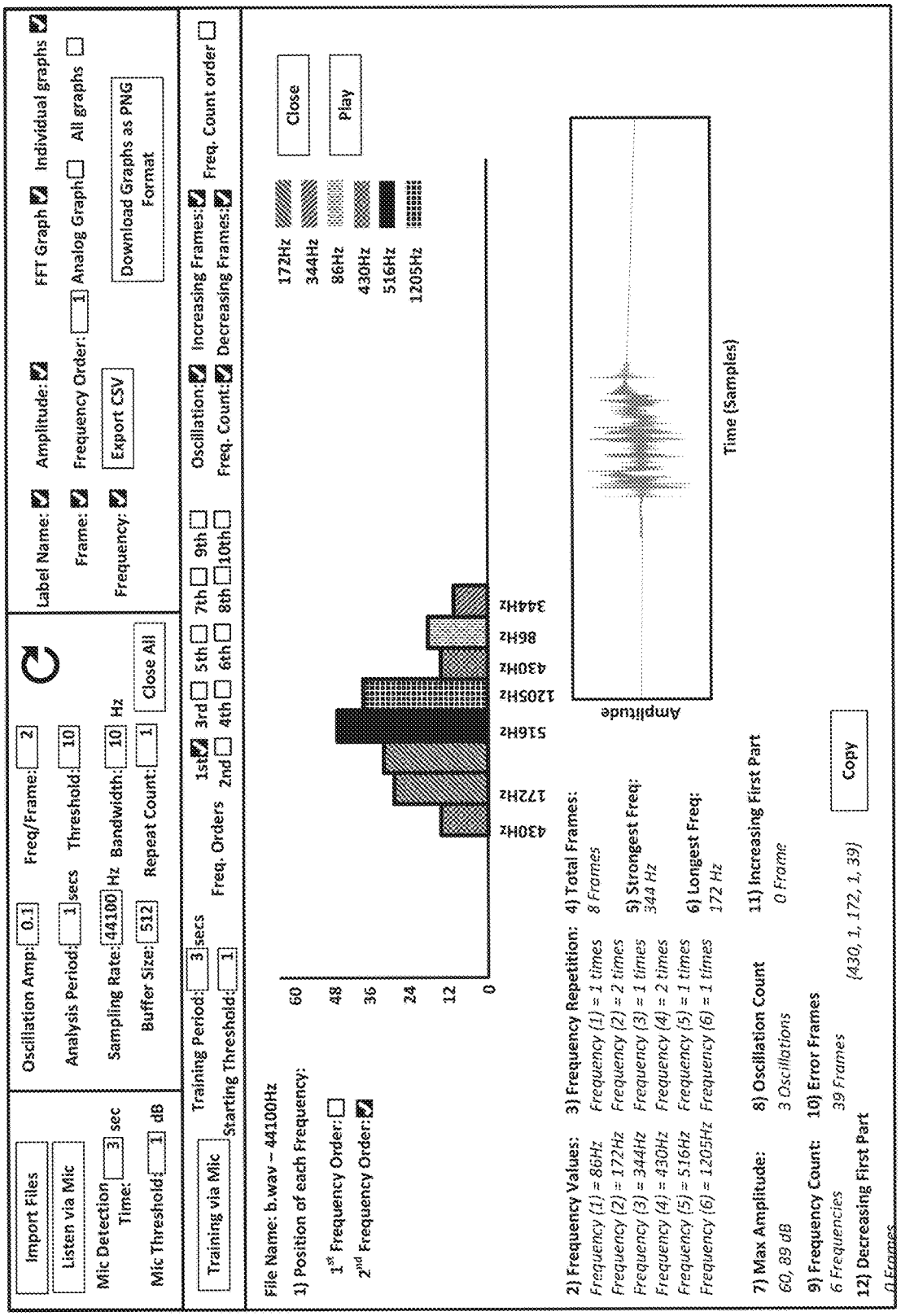
FIG. 16 is a screenshot of the screen of FIG. 14 with a user having selected to display another one of the multiple generated amplitude sequences and corresponding measurements.

FIG. 16 is a screenshot of the screen of FIG. 14 with a user having selected to display only the 2rd frequency order amplitude sequence, and corresponding measurements for just the $2^{nd}$ frequency order amplitude sequence. Using this feature, a user can hone in on the core of a sound by honing in at the $2^{nd}$ frequency order, thus filtering out from consideration the non-core content of the audio file that is present in the $1^{st}$ frequency order. Different kinds of sounds may require focus on $1^{st}$, $3^{rd}$, $4^{th}$ frequency orders, in order to discern content as distinct from environmental noise or noise that is attributable to the sound-making apparatus, rather than the meaning of the content to be conveyed using the sound-making apparatus.

Alternative configurations of computing system may be used to implement the systems and processes described herein.

Electronic data stores implemented in the database described herein may be one or more of a table, an array, a database, a structured data file, an XML file, or some other functional data store, such as hard disk 1022 or removable media 1024.

Although embodiments have been described with reference to the drawings, those of skill in the art will appreciate that variations and modifications may be made without departing from the spirit, scope and purpose of the invention as defined by the appended claims.

For example, systems and methods for processing electronic audio signals may employ and audio transducer and audio interface, or alternatively may receive and process electronic audio signals captured first using such an audio transducer by another system, remote in place and time. For example, a network interface of one system may be provided for receiving digital samples generated by an audio transducer from electronic audio signals captured using an audio transducer of another system. The network interface would convey the received digital samples along to a frame division process and the like for downstream processing and, in embodiments, production of user-apprehendable content. In other embodiments, an electronic storage system may store digital samples of electronic audio signals captured using an audio transducer and electronically stored in the electronic storage system locally to downstream processes such as a frame division process and the like, but may also be storing digital samples received from a remote location at which the capturing by an audio transducer was conducted, over a network, for example. The electronic storage system may be a fixed storage system such as a hard drive, may be a portable storage system such as a compact disc or USB drive, or may be networked storage system such as a cloud storage system. Various systems and methods may employ combinations of a network interface and a storage system for receiving in real-time streamed or as complete audio files, electronic audio signals, and for subjecting the electronic audio signals to frame division processes and other downstream processes such as the filtering and outputting.

The systems and methods may be deployed in similar ways for either enabling a user to study the sound based on frequency prominence, or to determine whether a given sound embodies prescribed patterns and satisfies prescribed thresholds based on amplitude sequences at various orders of frequency prominence in order to automatically classify the given sound in a particular way.

What is claimed is:

1. A system for generating a sound detection score based on comparing a sound-generating apparatus producing incoming spoken audio content to a sound-generating apparatus that produced reference spoken audio content, the system comprising:
    an input component receiving a plurality of digital samples of an input electronic audio signal generated based on capture by an audio transducer of incoming spoken audio content;
    a transform component transforming the digital samples into a plurality of amplitude sequences, each amplitude sequence n respectively comprising a sequence of amplitudes of nth-most prominent frequency content in frames of the input electronic audio signal;
    a test component testing at least one of the amplitude sequences to generate measurements, the testing comparing the measurements to one or more threshold parameter corresponding to a reference audio signal containing reference spoken audio content, to generate the sound detection score;
    a datastore storing, in association with a reference sound identifier corresponding to the reference audio signal, one or more transform parameter, one or more test parameter, and the one or more threshold parameter; and
    a configuration component configuring the transform component and the test component prior to the transforming and the testing based on the one or more transform parameter and the one or more test parameter, wherein the configuration component retrieves at least the one or more transform parameter, the one or more test parameter, and the one or more threshold parameter from the datastore based on the reference sound identifier.

2. The system of claim 1, further comprising:
    an output component generating, responsive to the test component generating the sound detection score, a representation for a user interface.

3. The system of claim 1, wherein a sound-generating apparatus producing the incoming spoken audio content comprises a person uttering the incoming spoken audio content.

4. The system of claim 3, wherein the incoming spoken audio content contains content that is indicative of a nature of the person uttering the incoming spoken audio content.

5. The system of claim 4, wherein a sound-generating apparatus that produced the reference spoken audio content comprises a person who uttered the reference spoken audio content.

6. The system of claim 5, wherein the reference spoken audio content contains content that is indicative of a nature of the person who uttered the reference spoken audio content.

7. The system of claim 1, wherein the transform component comprises:

a frame division component allocating sequences of the digital samples of the input electronic audio signal to respective frames;

a frequency transform component processing the digital samples by frame thereby to register, for each of the frames, a respective frequency set;

a filtering component filtering frequencies of each frequency set into a respective one of a plurality of orders based on relative prominence; and an amplitude sequence component generating the amplitude sequences based on the orders, wherein each amplitude sequence n respectively comprises a sequence of amplitudes of nth-order frequency content in the frames.

8. A processor-implemented method for generating a sound detection score based on comparing a sound-generating apparatus producing incoming spoken audio content to a sound-generating apparatus that produced reference spoken audio content, the method comprising:

receiving, by one or more processor, a plurality of digital samples of an input electronic audio signal generated based on capture by an audio transducer of incoming spoken audio content;

transforming, by the one or more processor, the digital samples into a plurality of amplitude sequences, each amplitude sequence n respectively comprising a sequence of amplitudes of nth-most prominent frequency content in frames of the input electronic audio signal;

testing, by the one or more processor, at least one of the amplitude sequences to generate measurements, the testing comparing the measurements to one or more threshold parameter corresponding to a reference audio signal containing reference spoken audio content, to generate the sound detection score;

storing in a datastore, by the one or more processor, in association with a reference sound identifier corresponding to the reference audio signal, one or more transform parameter, one or more test parameter, and the one or more threshold parameter; and configuring the one or more processor prior to the transforming and the testing based on the one or more transform parameter and the one or more test parameter, the configuring comprising retrieving at least the one or more transform parameter, the one or more test parameter, and the one or more threshold parameter from the datastore based on the reference sound identifier.

9. The processor-implemented method of claim 8, further comprising:

generating, responsive to generating the sound detection score, a representation for a user interface.

10. The processor-implemented method of claim 8, wherein a sound-generating apparatus producing the incoming spoken audio content comprises a person uttering the incoming spoken audio content.

11. The processor-implemented method of claim 10, wherein the incoming spoken audio content contains content that is indicative of a nature of the person uttering the incoming spoken audio content.

12. The processor-implemented method of claim 11, wherein a sound-generating apparatus that produced the reference spoken audio content comprises a person who uttered the reference spoken audio content.

13. The processor-implemented method of claim 12, wherein the reference spoken audio content contains content that is indicative of a nature of the person who uttered the reference spoken audio content.

14. The processor-implemented method of claim 8, wherein the transforming comprises:

allocating sequences of the digital samples of the input electronic audio signal to respective frames;

processing the digital samples by frame thereby to register, for each of the frames, a respective frequency set;

filtering frequencies of each frequency set into a respective one of a plurality of orders based on relative prominence; and generating the amplitude sequences based on the orders, wherein each amplitude sequence n respectively comprises a sequence of amplitudes of nth-order frequency content in the frames.

15. A non-transitory processor-readable medium embodying a computer program for generating a sound detection score based on comparing a sound-generating apparatus producing incoming spoken audio content to a sound-generating apparatus that produced reference spoken audio content, the computer program comprising program code that, when executed by at least one processor, cause the at least one processor to:

receive a plurality of digital samples of an input electronic audio signal generated based on capture by an audio transducer of incoming spoken audio content;

transform the digital samples into a plurality of amplitude sequences, each amplitude sequence n respectively comprising a sequence of amplitudes of nth-most prominent frequency content in frames of the input electronic audio signal;

test at least one of the amplitude sequences to generate measurements, including comparing the measurements to one or more threshold parameter corresponding to a reference audio signal containing reference spoken audio content, to generate the sound detection score;

store in a datastore, in association with a reference sound identifier corresponding to the reference audio signal, one or more transform parameter, one or more test parameter, and the one or more threshold parameter; and configure the at least one processor, prior to causing the at least one processor to conduct the transform and to conduct the test, based on the one or more transform parameter and the one or more test parameter, including retrieving at least the one or more transform parameter, the one or more test parameter, and the one or more threshold parameter from the datastore based on the reference sound identifier.

16. The non-transitory processor-readable medium of claim 15, wherein the computer program comprises program code that when executed by the at least one processor cause the at least one processor to:

generate, responsive to the sound detection score being generated, a representation for a user interface.

17. The non-transitory processor-readable medium of claim 15, wherein a sound-generating apparatus producing the incoming spoken audio content comprises a person uttering the incoming spoken audio content.

18. The non-transitory processor-readable medium of claim 17, wherein the incoming spoken audio content contains content that is indicative of a nature of the person uttering the incoming spoken audio content.

19. The non-transitory processor-readable medium of claim 18, wherein a sound-generating apparatus that produced the reference spoken audio content comprises a person who uttered the reference spoken audio content.

20. The non-transitory processor-readable medium of claim 19, wherein the reference spoken audio content contains content that is indicative of a nature of the person who uttered the reference spoken audio content.

21. The non-transitory processor-readable medium of claim 15, wherein the program code that when executed by the at least one processor cause the at least one processor to conduct the transform comprises program code that when executed by the at least one processor cause the at least one processor to:
- allocate sequences of the digital samples of the input electronic audio signal to respective frames;
- process the digital samples by frame thereby to register, for each of the frames, a respective frequency set;
- filter frequencies of each frequency set into a respective one of a plurality of orders based on relative prominence; and
- generate the amplitude sequences based on the orders, wherein each amplitude sequence n respectively comprises a sequence of amplitudes of nth-order frequency content in the frames.

\* \* \* \* \*